US008503336B2

(12) United States Patent
Rappaport et al.

(10) Patent No.: US 8,503,336 B2
(45) Date of Patent: *Aug. 6, 2013

(54) SYSTEM AND METHOD FOR DESIGN, TRACKING, MEASUREMENT, PREDICTION AND OPTIMIZATION OF DATA COMMUNICATION NETWORKS

(75) Inventors: Theodore Rappaport, Salem, VA (US); Roger Skidmore, Blacksburg, VA (US); Benjamin Henty, Blacksburg, VA (US)

(73) Assignee: Wireless Valley Communications, Inc, Blacksburg, VA (US)

( * ) Notice: Subject to any disclaimer, the term of this patent is extended or adjusted under 35 U.S.C. 154(b) by 1253 days.

This patent is subject to a terminal disclaimer.

(21) Appl. No.: 11/184,841

(22) Filed: Jul. 20, 2005

(65) Prior Publication Data

US 2005/0265321 A1    Dec. 1, 2005

(51) Int. Cl.
*H04L 12/66*    (2006.01)
(52) U.S. Cl.
USPC ........................ 370/277; 370/310; 370/252
(58) Field of Classification Search
USPC ........................................ 370/231, 350, 351
See application file for complete search history.

(56) References Cited

U.S. PATENT DOCUMENTS

| | | |
|---|---|---|
| 4,392,137 A | 7/1983 | Intlekofer et al. |
| 4,675,147 A | 6/1987 | Schaefer et al. |
| 4,736,453 A | 4/1988 | Schloemer |
| 4,817,012 A | 3/1989 | Cali |
| 4,843,459 A | 6/1989 | Perrin et al. |
| 4,885,694 A | 12/1989 | Pray et al. |
| 4,964,060 A | 10/1990 | Hartsog |
| 5,091,869 A | 2/1992 | Ingram et al. |
| 5,099,431 A | 3/1992 | Natarajan |
| 5,111,392 A | 5/1992 | Malin |
| 5,119,307 A | 6/1992 | Blaha et al. |
| 5,239,487 A | 8/1993 | Horejsi et al. |
| 5,272,642 A | 12/1993 | Suzuki |
| 5,293,640 A | 3/1994 | Gunmar et al. |
| 5,307,261 A | 4/1994 | Maki et al. |
| 5,319,363 A | 6/1994 | Welch et al. |
| 5,337,149 A | 8/1994 | Kozah et al. |
| 5,339,184 A | 8/1994 | Tang |
| 5,341,461 A | 8/1994 | Kikuchi et al. |
| 5,375,123 A | 12/1994 | Andersson et al. |

(Continued)

FOREIGN PATENT DOCUMENTS

| | | |
|---|---|---|
| CA | 2143592 A1 | 10/1995 |
| CN | 1260656 A | 7/2000 |

(Continued)

OTHER PUBLICATIONS

Skidmore "SMT Plus 1.0 user's Manual", Aug. 1996.*

(Continued)

*Primary Examiner* — Dang Ton
*Assistant Examiner* — Pamit Kaur
(74) *Attorney, Agent, or Firm* — Ingrassia Fisher & Lorenz, P.C.

(57) ABSTRACT

A system and method for design, tracking, measurement, prediction and optimization of data communications networks includes a site specific model of the physical environment, and performs a wide variety of different calculations for predicting network performance using a combination of prediction modes and measurement data based on the components used in the communications networks, the physical environment, and radio propagation characteristics.

36 Claims, 6 Drawing Sheets

U.S. PATENT DOCUMENTS

| | | | |
|---|---|---|---|
| 5,394,522 A | 2/1995 | Sanchez-Frank et al. | |
| 5,414,429 A | 5/1995 | Giraudy | |
| 5,425,076 A | 6/1995 | Knippelmier | |
| 5,434,791 A | 7/1995 | Koko et al. | |
| 5,450,615 A | 9/1995 | Fortune et al. | |
| 5,458,123 A | 10/1995 | Unger | |
| 5,463,464 A | 10/1995 | Ladewski | |
| 5,465,153 A | 11/1995 | Ladewski | |
| 5,465,390 A | 11/1995 | Cohen | |
| 5,467,441 A | 11/1995 | Stone et al. | |
| 5,482,050 A | 1/1996 | Smokoff et al. | |
| 5,485,568 A | 1/1996 | Venable et al. | |
| 5,491,644 A | 2/1996 | Pickering et al. | |
| 5,491,837 A | 2/1996 | Haartsen | |
| 5,493,679 A | 2/1996 | Virgil et al. | |
| 5,513,323 A | 4/1996 | Williams et al. | |
| 5,515,269 A | 5/1996 | Willis et al. | |
| 5,517,575 A | 5/1996 | Ladewski | |
| 5,528,518 A | 6/1996 | Bradshaw et al. | |
| 5,539,665 A | 7/1996 | Lamming et al. | |
| 5,553,312 A | 9/1996 | Gattey et al. | |
| 5,553,620 A | 9/1996 | Snider et al. | |
| 5,555,354 A | 9/1996 | Strasnick et al. | |
| 5,561,841 A | 10/1996 | Markus | |
| 5,564,070 A | 10/1996 | Want et al. | |
| 5,586,254 A | 12/1996 | Kondo | |
| 5,594,946 A | 1/1997 | Menich et al. | |
| 5,598,532 A | 1/1997 | Liron | |
| 5,608,854 A | 3/1997 | Labedz et al. | |
| 5,615,356 A | 3/1997 | King et al. | |
| 5,625,827 A | 4/1997 | Krause et al. | |
| 5,627,879 A | 5/1997 | Russell et al. | |
| 5,636,344 A | 6/1997 | Lewis | |
| 5,644,623 A | 7/1997 | Gulledge | |
| 5,668,555 A | 9/1997 | Starr | |
| 5,668,736 A | 9/1997 | Douglas et al. | |
| 5,668,939 A | 9/1997 | Numao et al. | |
| 5,689,355 A | 11/1997 | Okubo et al. | |
| 5,689,705 A | 11/1997 | Fino et al. | |
| 5,701,403 A | 12/1997 | Watanabe et al. | |
| 5,710,758 A | 1/1998 | Soliman et al. | |
| 5,724,264 A | 3/1998 | Rosenberg et al. | |
| 5,726,979 A | 3/1998 | Henderson et al. | |
| 5,754,831 A | 5/1998 | Berman | |
| 5,755,072 A | 5/1998 | Lingafelter | |
| 5,761,093 A | 6/1998 | Urbish et al. | |
| 5,761,674 A | 6/1998 | Ito | |
| 5,764,518 A | 6/1998 | Collins | |
| 5,774,669 A | 6/1998 | George et al. | |
| 5,774,876 A | 6/1998 | Woolley et al. | |
| 5,794,128 A | 8/1998 | Brockel et al. | |
| 5,794,216 A | 8/1998 | Brown | |
| 5,799,154 A | 8/1998 | Kuriyan | |
| 5,802,146 A | 9/1998 | Dulman | |
| 5,808,905 A | 9/1998 | Normann et al. | |
| 5,809,282 A | 9/1998 | Cooper et al. | |
| 5,815,395 A | 9/1998 | Hart et al. | |
| 5,821,937 A | 10/1998 | Tonelli et al. | |
| 5,825,759 A | 10/1998 | Liu | |
| 5,828,960 A | 10/1998 | Tang et al. | |
| 5,831,610 A | 11/1998 | Tonelli et al. | |
| 5,832,389 A | 11/1998 | Dent | |
| 5,845,124 A | 12/1998 | Berman | |
| 5,859,839 A | 1/1999 | Ahlenius et al. | |
| 5,861,887 A | 1/1999 | Butler et al. | |
| 5,867,112 A | 2/1999 | Kost | |
| 5,877,777 A | 3/1999 | Colwell | |
| 5,878,328 A | 3/1999 | Chawla et al. | |
| 5,905,501 A | 5/1999 | Kato | |
| 5,907,494 A | 5/1999 | Dangelo et al. | |
| 5,907,850 A | 5/1999 | Krause et al. | |
| 5,917,808 A | 6/1999 | Kosbab | |
| 5,920,607 A | 7/1999 | Berg | |
| 5,923,850 A | 7/1999 | Barroux | |
| 5,926,762 A | 7/1999 | Arpee et al. | |
| 5,937,014 A * | 8/1999 | Pelin et al. | 375/340 |
| 5,940,196 A | 8/1999 | Piehler et al. | |
| 5,945,976 A | 8/1999 | Iwamura et al. | |
| 5,948,055 A | 9/1999 | Pulsipher et al. | |
| 5,949,335 A | 9/1999 | Maynard | |
| 5,949,988 A | 9/1999 | Feisullin et al. | |
| 5,953,669 A | 9/1999 | Stratis et al. | |
| 5,956,028 A | 9/1999 | Matsui et al. | |
| 5,963,867 A | 10/1999 | Reynolds et al. | |
| 5,970,406 A | 10/1999 | Komara | |
| 5,977,851 A | 11/1999 | Stancil et al. | |
| 5,982,330 A | 11/1999 | Koyanagi et al. | |
| 5,984,511 A | 11/1999 | Vasey-Glandon et al. | |
| 5,986,670 A | 11/1999 | Dries et al. | |
| 5,987,328 A | 11/1999 | Ephremides et al. | |
| 5,994,984 A | 11/1999 | Stancil et al. | |
| 6,002,941 A | 12/1999 | Ablay et al. | |
| 6,006,021 A | 12/1999 | Tognazzini | |
| 6,012,152 A | 1/2000 | Douik et al. | |
| 6,014,503 A | 1/2000 | Nagata et al. | |
| 6,014,565 A | 1/2000 | Bonta | |
| 6,018,625 A | 1/2000 | Hayball et al. | |
| 6,021,316 A | 2/2000 | Heiska et al. | |
| 6,032,105 A | 2/2000 | Lee et al. | |
| 6,038,547 A | 3/2000 | Casto | |
| 6,044,273 A | 3/2000 | Tekinay | |
| 6,058,102 A | 5/2000 | Drysdale et al. | |
| 6,058,262 A | 5/2000 | Kawas et al. | |
| 6,059,842 A | 5/2000 | Dumarot et al. | |
| 6,061,722 A | 5/2000 | Lipa et al. | |
| 6,075,541 A | 6/2000 | Maclinovsky | |
| 6,084,168 A | 7/2000 | Sitrick | |
| 6,085,335 A | 7/2000 | Djoko et al. | |
| 6,088,522 A | 7/2000 | Lee et al. | |
| 6,091,362 A | 7/2000 | Stilp et al. | |
| 6,097,957 A | 8/2000 | Bonta et al. | |
| 6,104,699 A | 8/2000 | Holender et al. | |
| 6,108,309 A | 8/2000 | Cohoe et al. | |
| 6,111,857 A | 8/2000 | Soliman et al. | |
| 6,112,088 A | 8/2000 | Haartsen | |
| 6,119,009 A | 9/2000 | Baranger et al. | |
| 6,119,010 A | 9/2000 | Labedz | |
| 6,122,083 A | 9/2000 | Ohta et al. | |
| H1896 H | 10/2000 | Hoffpauir et al. | |
| 6,134,514 A | 10/2000 | Liu et al. | |
| 6,141,016 A | 10/2000 | Yuura et al. | |
| 6,144,366 A | 11/2000 | Numazaki et al. | |
| 6,148,010 A | 11/2000 | Sutton et al. | |
| 6,151,310 A | 11/2000 | Dent | |
| 6,162,488 A | 12/2000 | Gevelber et al. | |
| 6,199,032 B1 | 3/2001 | Anderson | |
| 6,204,813 B1 | 3/2001 | Wadell et al. | |
| 6,208,833 B1 | 3/2001 | Preschutti et al. | |
| 6,215,495 B1 | 4/2001 | Grantham et al. | |
| 6,229,540 B1 | 5/2001 | Tonelli et al. | |
| 6,236,409 B1 | 5/2001 | Hartman | |
| 6,243,772 B1 | 6/2001 | Ghori et al. | |
| 6,253,086 B1 | 6/2001 | Parantainen et al. | |
| 6,256,506 B1 | 7/2001 | Alexander, Jr. et al. | |
| 6,259,924 B1 | 7/2001 | Alexander, Jr. et al. | |
| 6,266,615 B1 | 7/2001 | Jin | |
| 6,272,447 B1 | 8/2001 | Gavin et al. | |
| 6,275,691 B1 | 8/2001 | Lee et al. | |
| 6,283,759 B1 | 9/2001 | Price et al. | |
| 6,285,377 B1 | 9/2001 | Greenbaum et al. | |
| 6,289,203 B1 | 9/2001 | Smith et al. | |
| 6,289,299 B1 | 9/2001 | Daniel et al. | |
| 6,295,535 B1 | 9/2001 | Radcliffe et al. | |
| 6,306,089 B1 | 10/2001 | Coleman et al. | |
| 6,308,072 B1 | 10/2001 | Labedz et al. | |
| 6,311,144 B1 | 10/2001 | Abu El Ata | |
| 6,317,599 B1 | 11/2001 | Rappaport et al. | |
| 6,320,577 B1 | 11/2001 | Alexander | |
| 6,326,987 B2 | 12/2001 | Alexander | |
| 6,330,005 B1 | 12/2001 | Tonelli et al. | |
| 6,331,836 B1 | 12/2001 | Jandrell | |
| 6,337,688 B1 | 1/2002 | Berstis | |
| 6,338,031 B1 | 1/2002 | Lee et al. | |
| 6,345,239 B1 | 2/2002 | Bowman-Amuah | |
| 6,346,939 B1 | 2/2002 | Isaacs | |
| 6,356,758 B1 | 3/2002 | Almeida et al. | |
| 6,356,841 B1 | 3/2002 | Hamrick et al. | |

| | | |
|---|---|---|
| 6,384,823 B1 | 5/2002 | Donoghue |
| 6,385,454 B1 | 5/2002 | Bahl et al. |
| 6,393,432 B1 | 5/2002 | Flansburg et al. |
| 6,408,312 B1 | 6/2002 | Forthman et al. |
| 6,414,679 B1 | 7/2002 | Miodonski et al. |
| 6,424,264 B1 | 7/2002 | Giraldin et al. |
| 6,442,507 B1 | 8/2002 | Skidmore et al. |
| 6,445,740 B1 | 9/2002 | Mallart et al. |
| 6,446,030 B1 | 9/2002 | Hoffman et al. |
| 6,446,031 B1 | 9/2002 | Welch |
| 6,459,435 B1 | 10/2002 | Eichel |
| 6,463,431 B1 | 10/2002 | Schmitt |
| 6,466,938 B1 | 10/2002 | Goldberg |
| 6,470,195 B1 | 10/2002 | Meyer |
| 6,487,414 B1 | 11/2002 | Tanay et al. |
| 6,487,417 B1 | 11/2002 | Rossoni et al. |
| 6,493,679 B1 | 12/2002 | Rappaport et al. |
| 6,496,290 B1 | 12/2002 | Lee |
| 6,499,006 B1 | 12/2002 | Rappaport et al. |
| 6,505,045 B1 | 1/2003 | Hills et al. |
| 6,507,742 B1 | 1/2003 | Lin et al. |
| 6,509,906 B1 | 1/2003 | Awe et al. |
| 6,519,571 B1 | 2/2003 | Guheen et al. |
| 6,560,569 B1 | 5/2003 | Abu El Ata |
| 6,611,867 B1 | 8/2003 | Bowman-Amuah |
| 6,615,166 B1 | 9/2003 | Guheen et al. |
| 6,618,630 B1 | 9/2003 | Jundt et al. |
| 6,625,454 B1 | 9/2003 | Rappaport et al. |
| 6,625,651 B1 * | 9/2003 | Swartz et al. ............... 709/226 |
| 6,631,267 B1 * | 10/2003 | Clarkson et al. ............. 455/446 |
| 6,643,614 B2 | 11/2003 | Ding et al. |
| 6,674,403 B2 | 1/2004 | Gray et al. |
| 6,675,328 B1 * | 1/2004 | Krishnamachari et al. ... 714/704 |
| 6,678,591 B2 | 1/2004 | Ohmura et al. |
| 6,681,140 B1 | 1/2004 | Heil |
| 6,683,562 B2 | 1/2004 | Stayton et al. |
| 6,690,652 B1 | 2/2004 | Sadri |
| 6,708,329 B1 | 3/2004 | Whitehill et al. |
| 6,721,614 B2 | 4/2004 | Duncan et al. |
| 6,721,769 B1 | 4/2004 | Rappaport et al. |
| 6,748,233 B1 | 6/2004 | Arnold et al. |
| 6,754,488 B1 | 6/2004 | Won et al. |
| 6,772,103 B1 | 8/2004 | King |
| 6,785,547 B1 | 8/2004 | Heiska et al. |
| 6,791,571 B1 | 9/2004 | Lamb |
| 6,795,858 B1 * | 9/2004 | Jain et al. ............... 709/226 |
| 6,804,578 B1 | 10/2004 | Ghaffari |
| 6,809,745 B1 | 10/2004 | O'Donnell et al. |
| 6,829,584 B2 | 12/2004 | Loveland |
| 6,850,946 B1 | 2/2005 | Rappaport et al. |
| 6,876,951 B2 | 4/2005 | Skidmore et al. |
| 6,901,051 B1 * | 5/2005 | Hou et al. ............... 370/231 |
| 6,912,487 B1 | 6/2005 | Garcia et al. |
| 6,931,364 B1 | 8/2005 | Anturna |
| 6,947,708 B2 | 9/2005 | Fattouch |
| 6,971,063 B1 | 11/2005 | Rappaport et al. |
| 6,973,622 B1 | 12/2005 | Rappaport et al. |
| 6,985,929 B1 | 1/2006 | Wilson et al. |
| 7,019,753 B2 | 3/2006 | Rappaport et al. |
| 7,023,356 B2 | 4/2006 | Burkhardt et al. |
| 7,035,642 B2 | 4/2006 | Rappaport et al. |
| 7,047,014 B1 | 5/2006 | Friday et al. |
| 7,054,643 B2 | 5/2006 | Trossen et al. |
| 7,055,107 B1 | 5/2006 | Rappaport et al. |
| 7,085,697 B1 | 8/2006 | Rappaport et al. |
| 7,096,034 B2 | 8/2006 | Zhang et al. |
| 7,096,160 B2 | 8/2006 | Skidmore et al. |
| 7,096,173 B1 | 8/2006 | Rappaport et al. |
| 7,124,101 B1 | 10/2006 | Mikurak |
| 7,155,228 B2 | 12/2006 | Rappaport et al. |
| 7,162,507 B2 | 1/2007 | Carter |
| 7,164,883 B2 | 1/2007 | Rappaport et al. |
| 7,171,208 B2 | 1/2007 | Rappaport et al. |
| 7,235,766 B2 | 6/2007 | Shur et al. |
| 7,243,054 B2 | 7/2007 | Rappaport et al. |
| 7,246,045 B1 | 7/2007 | Rappaport et al. |
| 7,263,471 B2 | 8/2007 | Barbaresi et al. |
| 7,286,971 B2 | 10/2007 | Rappaport et al. |
| 7,295,119 B2 | 11/2007 | Rappaport et al. |
| 7,295,960 B2 | 11/2007 | Rappaport et al. |
| 7,299,168 B2 | 11/2007 | Rappaport et al. |
| 7,539,495 B2 | 5/2009 | Kalika et al. |
| 7,574,323 B2 | 8/2009 | Rappaport et al. |
| 7,596,518 B2 | 9/2009 | Rappaport et al. |
| 7,680,644 B2 | 3/2010 | Rappaport et al. |
| 7,711,687 B2 | 5/2010 | Rappaport et al. |
| 7,773,995 B2 | 8/2010 | Rappaport et al. |
| 2001/0011215 A1 | 8/2001 | Beeker et al. |
| 2001/0051503 A1 | 12/2001 | Lush |
| 2002/0017038 A1 | 2/2002 | Umezawa |
| 2002/0023244 A1 | 2/2002 | Hatanaka et al. |
| 2002/0028681 A1 | 3/2002 | Lee et al. |
| 2002/0030600 A1 | 3/2002 | Starner et al. |
| 2002/0046259 A1 | 4/2002 | Glorikian |
| 2002/0052941 A1 | 5/2002 | Patterson |
| 2002/0059052 A1 | 5/2002 | Bloch et al. |
| 2002/0075825 A1 | 6/2002 | Hills et al. |
| 2002/0082859 A1 | 6/2002 | Lancos et al. |
| 2002/0093926 A1 | 7/2002 | Kilfoyle |
| 2002/0095486 A1 | 7/2002 | Bahl |
| 2002/0130861 A1 | 9/2002 | Ujiie et al. |
| 2002/0155843 A1 | 10/2002 | Bahl et al. |
| 2002/0177982 A1 | 11/2002 | Boulouednine et al. |
| 2002/0188717 A1 | 12/2002 | Mushlin et al. |
| 2003/0023411 A1 | 1/2003 | Witmer et al. |
| 2003/0023718 A1 | 1/2003 | Smith |
| 2003/0050878 A1 | 3/2003 | Rappaport et al. |
| 2003/0055604 A1 | 3/2003 | Skidmore et al. |
| 2003/0197721 A1 | 10/2003 | Mindrum et al. |
| 2003/0225563 A1 | 12/2003 | Gonos |
| 2003/0229478 A1 | 12/2003 | Rappaport et al. |
| 2003/0232598 A1 | 12/2003 | Aljadeff et al. |
| 2004/0002364 A1 | 1/2004 | Trikkonen et al. |
| 2004/0017790 A1 | 1/2004 | del Prado et al. |
| 2004/0038683 A1 | 2/2004 | Rappaport et al. |
| 2004/0072577 A1 | 4/2004 | Myllymaki et al. |
| 2004/0077359 A1 | 4/2004 | Bernas et al. |
| 2004/0090943 A1 | 5/2004 | da Costa et al. |
| 2004/0122645 A1 | 6/2004 | Shevenell et al. |
| 2004/0133415 A1 | 7/2004 | Rappaport et al. |
| 2004/0143428 A1 | 7/2004 | Rappaport et al. |
| 2004/0162840 A1 | 8/2004 | Rappaport et al. |
| 2004/0177085 A1 | 9/2004 | Rappaport et al. |
| 2004/0186847 A1 | 9/2004 | Rappaport et al. |
| 2004/0202196 A1 | 10/2004 | Sindhushayana et al. |
| 2004/0211888 A1 | 10/2004 | Shur et al. |
| 2004/0259554 A1 | 12/2004 | Rappaport et al. |
| 2004/0259555 A1 | 12/2004 | Rappaport et al. |
| 2005/0131619 A1 | 6/2005 | Rappaport et al. |
| 2005/0143077 A1 | 6/2005 | Charbonneau |
| 2005/0204028 A1 | 9/2005 | Bahl et al. |
| 2005/0253751 A1 | 11/2005 | Feisst et al. |
| 2005/0265321 A1 | 12/2005 | Rappaport et al. |
| 2006/0015814 A1 | 1/2006 | Rappaport et al. |
| 2006/0019679 A1 | 1/2006 | Rappaport et al. |
| 2006/0036406 A1 | 2/2006 | Skidmore et al. |
| 2006/0116853 A1 | 6/2006 | Rappaport et al. |
| 2007/0099622 A1 | 5/2007 | Rappaport et al. |
| 2007/0117567 A1 | 5/2007 | Rappaport et al. |

FOREIGN PATENT DOCUMENTS

| | | |
|---|---|---|
| EP | 483039 A2 | 4/1992 |
| EP | 0928121 A2 | 7/1999 |
| JP | H06-501858 A | 3/1994 |
| JP | 06-187349 A | 7/1994 |
| JP | 07-035799 A | 2/1995 |
| JP | H07-503345 A1 | 4/1995 |
| JP | 08-194029 A | 7/1996 |
| JP | 08-214363 A | 8/1996 |
| JP | 09-223092 A | 8/1997 |
| JP | 10-163985 A | 6/1998 |
| RU | 2119188 C1 | 9/1998 |
| SU | 1550528 A1 | 3/1990 |
| WO | 99/30448 A1 | 6/1999 |
| WO | 0013115 | 3/2000 |
| WO | 0073953 A1 | 12/2000 |
| WO | 0074401 A1 | 12/2000 |
| WO | 01/06349 A1 | 1/2001 |

OTHER PUBLICATIONS

Response to Chinese Office Action, 201010150086.8, dated Aug. 3, 2011, and English translation thereof.
Notice of allowance mailed on Oct. 25, 2005 in related counterpart U.S. Appl. No. 10/015,954.
Notice of allowance dated Apr. 17, 2006 in related counterpart Mexican Patent Application No. PA/A/2003/002652.
Non Final Office Action mailed on Jun. 2, 2005 in related counterpart U.S. Appl. No. 10/015,954.
Non Final Office Action mailed on Nov. 17, 2004 in related counterpart U.S. Appl. No. 10/015,954.
Final Office Action mailed on Jul. 14, 2004 in related counterpart U.S. Appl. No. 10/015,954.
Non Final Office Action mailed on Feb. 5, 2004 in related counterpart U.S. Appl. No. 10/015,954.
International Search Report mailed on Sep. 16, 2002 in related counterpart International Application No. PCT/US01/47704.
Office Action mailed on Oct. 16, 2006 in related counterpart Australian Patent Application No. 2002230729.
English language translation of Office Action mailed on Apr. 29, 2005 in related counterpart Chinese Patent Application No. 01820843.
English language translation of Office Action mailed on Jun. 23, 2006 in related counterpart Chinese Patent Application No. 01820843.
Supplementary European Search Report mailed on Mar. 27, 2007 in related counterpart European Patent Application No. 01990973.
Office Action mailed on Nov. 9, 2007 in related counterpart European Patent Application No. 01990973.
Office Action mailed on Feb. 21, 2012 in related counterpart European Patent Application No. 01990973.
Office Action mailed on Nov. 2, 2009 in related counterpart European Patent Application No. 01990973.
First Examination Report dated Feb. 12, 2007 in related counterpart Indian Patent Application No. 00930//DELNP/2003.
English language translation of Office Action mailed on Jan. 8, 2008 in related counterpart Japanese Patent Application No. 2002-552231.
English language translation of Decision of Rejection mailed on Jun. 24, 2008 in related counterpart Japanese Patent Application No. 2002-552231.
Notice of allowance mailed on Feb. 23, 2007 in related counterpart U.S. Appl. No. 09/632,803.
Non Final Office Action mailed on Jun. 5, 2006 in related counterpart U.S. Appl. No. 09/632,803.
Non Final Office Action mailed on Dec. 2, 2005 in related counterpart U.S. Appl. No. 09/632,803.
Non Final Office Action mailed on Mar. 10, 2005 in related counterpart U.S. Appl. No. 09/632,803.
Non Final Office Action mailed on Aug. 4, 2004 in related counterpart U.S. Appl. No. 09/632,803.
Notice of allowance mailed on Jul. 13, 2007 in related counterpart U.S. Appl. No. 10/956,027.
Non Final Office Action mailed on Feb. 8, 2007 in related counterpart U.S. Appl. No. 10/956,027.
Office Action mailed on Nov. 12, 2007 in related counterpart European Patent Application No. 01961747.
Office Action mailed on May 25, 2011 in related counterpart European Patent Application No. 01961747.
Supplementary European Search Report mailed on Oct. 13, 2005 in related counterpart European Patent Application No. 01961747.
Office Action mailed on Jun. 14, 2006 in related counterpart Australian Patent Application No. 2001282991.
Office Action mailed on Aug. 23, 2007 in related counterpart Australian Patent Application No. 2001282991.
Office Action mailed on Feb. 7, 2008 in related counterpart Canadian Patent Application No. 2416417.
First Examination Report mailed on Aug. 29, 2005 in related counterpart Indian Patent Application No. 97/MUMNP/2003.
English language translation of Office Action mailed on Jun. 1, 2010 in related counterpart Japanese Patent Application No. 2002-517627.
English language translation of Decision to grant mailed on Jan. 24, 2011 in related counterpart Japanese Patent Application No. 2002-517627.
English language translation of Office Action mailed on Sep. 28, 2010 in related counterpart Japanese Patent Application No. 2002-517627.
English language translation of Office Action mailed on Apr. 11, 2007 in related counterpart Korean Patent Application No. 10-2003-7001592.
Notice of allowance mailed on Mar. 19, 2009 in related counterpart Canadian Patent Application No. 2423157.
Office Action mailed on Jul. 30, 2008 in related counterpart Canadian Patent Application No. 2423157.
English language translation of Office Action mailed on Jul. 29, 2005 in related counterpart Chinese Patent Application No. 01816269.
English language translation of Office Action mailed on Nov. 9, 2006 in related counterpart Chinese Patent Application No. 01816269.
English language translation of Office Action mailed on Feb. 24, 2006 in related counterpart Chinese Patent Application No. 01816269.
Office Action mailed on Mar. 24, 2011 in related counterpart Chinese Patent Application No. 20101015008.
Office Action mailed on May 30, 2006 in related counterpart European Patent Application No. 01971240.
Notice of allowance mailed on Mar. 28, 2007 in related counterpart European Patent Application No. 01971240.
Supplementary European Search Report mailed on Jan. 10, 2006 in related counterpart European Patent Application No. 01971240.
English language translation of Notice of allowance issued on Dec. 26, 2007 in related counterpart Korean Patent Application No. 10-2003-7004297.
International Search Report mailed on Jan. 15, 2002 in related counterpart International Application No. PCT/US01/29419.
Notice of allowance mailed on Jul. 8, 2005 in related counterpart U.S. Appl. No. 09/668,145.
Non Final Office Action mailed on Oct. 7, 2004 in related counterpart U.S. Appl. No. 09/668,145.
First Examination Report mailed on Mar. 5, 2007 in related counterpart Indian Patent Application No. 00501/DELNP/2003.
Non Final Office Action mailed on Mar. 28, 2012 in related counterpart U.S. Appl. No. 11/184,841.
Response dated Mar. 26, 2009 to Office Action in U.S. Appl. No. 11/405,167 dated Jan. 12, 2009.
Office Action in U.S. Appl. No. 11/624,289 dated Jul. 27, 2009.
Translation of Fourth Office Action in Chinese Application serial No. 01816269.X dated Sep. 11, 2009.
Response dated May 22, 2009 to office action in U.S. Appl. No. 10/807,388 dated May 15, 2009.
Notice of Allowance in U.S. Appl. No. 10/697,557 dated Sep. 2, 2009.
Office Action in U.S. Appl. No. 10/807,388 dated May 15, 2009.
Office Action in U.S. Appl. No. 10/807,388 dated Aug. 5, 2009.
Office Action in U.S. Appl. No. 11/176,668 dated May 21, 2009.
Response dated Aug. 18, 2009 to Office Action in U.S. Appl. No. 11/176,668 dated May 21, 2009.
Response dated Jun. 24, 2009 to Office Action in U.S. Appl. No. 11/186,929 dated Mar. 26, 2009.
Office Action in U.S. Appl. No. 11/405,167 dated Aug. 10, 2009.
Response dated Oct. 21, 2009 to Office Action in U.S. Appl. No. 90/009,123 dated Aug. 21, 2009.
Office Action in U.S. Appl. No. 10/807,388 dated Apr. 5, 2007.
Office Action in U.S. Appl. No. 10/807,388 dated Dec. 31, 2007.
Office Action in U.S. Appl. No. 10/807,388 dated Jun. 10, 2008.
Office Action in U.S. Appl. No. 11/329,126 dated Sep. 25, 2008.
Office Action in U.S. Appl. No. 11/329,126 dated Dec. 1, 2008.
Notice of Allowance issued in U.S. Appl. No. 11/329,126 dated Mar. 31, 2009.
Office Action in U.S. Appl. No. 11/186,929 dated Sep. 30, 2008.
Office Action in U.S. Appl. No. 11/186,929 dated Mar. 26, 2009.
Office Action in U.S. Appl. No. 11/697,557 dated Feb. 9, 2007.
Office Action in U.S. Appl. No. 11/697,557 dated Nov. 15, 2007.
Office Action in U.S. Appl. No. 11/697,557 dated Aug. 5, 2008.
Office Action in U.S. Appl. No. 11/697,557 dated Feb. 12, 2009.
Office Action in U.S. Appl. No. 11/176,668 dated Sep. 8, 2008.
Office Action in U.S. Appl. No. 11/176,668 dated Feb. 25, 2009.
Office Action in U.S. Appl. No. 10/266,711 dated Mar. 20, 2008.

Office Action in U.S. Appl. No. 10/266,711 dated Aug. 22, 2008.
Office Action in U.S. Appl. No. 10/266,711 dated Dec. 11, 2008.
Office Action in U.S. Appl. No. 11/405,167 dated Sep. 16, 2008.
Office Action in U.S. Appl. No. 11/405,167 dated Jan. 12, 2009.
Notice of Intent to Issue ExParte Reexamination Certificate in U.S. Appl. No. 90/009,123 dated Oct. 29, 2009.
Office Action in U.S. Appl. No. 90/009,123 dated Aug. 21, 2009.
Office Action in U.S. Appl. No. 90/009,123 dated Feb. 6, 2009.
Skidmore, "SMT Plus 1.0 user's manual", Aug. 1996.
Zhang, "Formulation of multiple diffraction by trees and buildings for radio propagation predictions for local multipoint distribution service", J. Res. Natl. Inst. Stand. Technol., 1999.
Fellner, D., "Radio wave propagation (CARPET)", Computer Graphics, Dept. of Computer Science, 1998.
Rappaport et al., "The future of wireless communications", MPRG, 1999.
Ulffe et al., "Measuring the 2.4 GHz Band for indoor wireless communications", Wireless design laboratory, 2000.
Hashemi, H., "The indoor radio propagation channel", IEEE. vol. 81, No. 7, Jul. 1993.
Liu et al., "Modelling microcellular radio wave propagation", IEEE, May 1996.
Fellner, et al., "MRT—A tool for simulations in 3D geometric domains", ESM, 1997.
Stamm et al., "A prototype system for light propagation in terrains", IEEE, 1998.
"EAC-50 Repeater System for In-Building Coverage", Installation and Operation Manual, Allen Telecom Company, 2000 (Referred to as EAC-50).
Rappaport, T., et al., "Site Plannner 3.0, User's Manual", Wireless Valley Communications, Inc. 1998.
Bertoni, H., et al., "UHF Propagation Prediction for Wireless Personal Communications", Proceeding of IEEE, vol. 82, No. 9, Sep. 1994, pp. 1333-1359.
Honcharenko, W., et al., "Mechanisms Governing UHF Propagation on Single Floors in Modern Office Buildings", IEEE Transactions on Vehicular Technology, vol. 41, No. 4, Nov. 1992, pp. 496-504.
"SMT Plus: Site Modeling Tool. A Software Tool for Planning Indoor Wireless Systems." 2001. Printed from http://www.mprg.org/research/smt/smt.shtml on Mar. 5, 2004.
"MPRG Industrial Affiliate Program." 2001 Printed from http://www.mprg.org/partnerships/affiliate.shtml on Mar. 5, 2004.
"Wireless Research Leads to Indoor Planning Tool," EE Connection, Feb. 1997. Printed from http://w.ecpe.vt.edu/ecenews/feb97/smt.html on Mar. 5, 2004.
"VTIP Disclosure No. 96-013." Virginia Tech Intellectual Properties, Inc. 1997-2001. Printed from http://www.vtip.org/licensing/disclosures/96-0 3.htm on Mar. 5, 2004.
"Communication Products Special Section." EDN Access, Aug. 1, 1996. Printed from http://www.e-insite.net/ednmag/archives/1996/080196/16dfl.htm on Mar. 5, 2004.
Panjwani et al., "Interactive Computation of Coverage Regions for Wireless Communication in Multifloored Indoor Environments." IEEE Journal of Selected Areas in Communication. Apr. 1996. pp. 420-430.
Skidmore et al. "Interactive Coverage Region and System Design Simulation for Wireless Communication Systems in Multifloored Indoor Environments: SMT Plus." 5th Int'l Conference on Universal Personal Communications, Sep. 29-Oct. 2, 1996. pp. 646-650.
Skidmore et al. "A Comprehensive In-Building and Microcellular Wireless Communication System Design Tool." The Bradley ,—Dept. of Electrical Engineering, Virginia Tech Univ. MPRG-TR-97-13. Jun. 1997.
Valenzuela, R A., "A ray tracing approach to predicting Indoor Wireless Transmission", IEEE 1993.
Santarini, M., EETimes article "Cadence offers XML-based PCB library tool", Published Apr. 24, 2000 pp. 1-4, http://www.eetimes.com/story/OEG20000424S0031.
Welch, B., et all., "Web Enabling Applications" Fifth Annual Tcl/Tk Workshop USENIX, 1997, pp. 189-190 of the Proceedings (4 pg. printout from web).

Website "WiSE Design of Indoor & Outdoor Wireless Systems"—http://web.archive.org/web|200212190834211 www. belllabs.com|org|wireless|wisext.html—Dec. 2002.
Fortune, S., et al., "WISE design of indoor wireless systems: practical computation and optimization", Publication. Date: Spring 1995 vol. 2, Issue: 1 pp. 58-68.
Hansen, W., "Rendering Tcl/TK windows as HTML"; Mar. 5 2003—Carnegie Mellon University.
Landron, O, et al., "A comparison of theoretical and empirical reflection coefficients for typical exterior wall surfaces in a mobile radio environment, Antennas and Propagation", IEEE Transactions pp. 341-351, vol. 44, Issue: 3, Mar. 1996.
Valenzula, R., et al., "Estimating local mean signal strength of indoor multipath propagation", Vehicular Technology, IEEE Transactions, pp. 203-212, vol. 46, Issue: 1, Feb. 1997.
Skidmore et al. "Towards Integrated PSEs for Wireless Communications: Experiences with the S4W and SitePlanner Projects". Oct. 28, 2003.
Skidmore. et al. "Towards Integrated PSEs for Wireless Communications: Experiences with the S4W and SitePlanner Projects". ACM SIGMOBILE Mobile Computing and Communications Review. vol. 8, Issue 2. Apr. 2004. pp. 20-34.
EDX, "Mircocell/Indoor Module", Apr. 2000. p. 1-63.
Trademark, "Siteplanner" 1999, registration No. 2360957, published by United States Patent and Trademark Office, p. 1.
Newhall, W.G., "Wideband Propagation Measurement Results, Simulation Models, and Processing Techniques for a Sliding Correlator Measurement System", Master of Science Dissertation, Virginia Polytechnic Institute and State University, Nov. 13, 1992, p. 1-159.
Rappaport, T.S., "Last-Mile Wireless Propagation Modeling, Measurment, & Prediction" HP. 1998. p. 1-20.
EDX Signal Pro. 1996. p. 1-13 Retrieved from Internet: <URL: http://www.edx.com/products/sp/php on Sep. 12, 2005.
EDX Data File Format Specifications. Jul. 2001 p. 1-24.
Borst, S., et al., "Wireless Simulation and Self-organizing Spectrum Management" Bell Labs Technical Journal. 1997 p. 81-98.
Cambridge Research Associates: "Synthetic Vision Systems" 1999 p. 1-31.
Huang, Y.P., "Triangular Irregular Network Generation and Topographical Modeling", 1989 Computers-In-Industry. vol. 12, No. 3, p. 203-213.
P. Bahl, V. Padmanabhan, and A. Balachandran, "A Software System for Locating Mobile Users: Design, Evaluation, and Lessons," Microsoft Technical Report, Apr. 2000.
G. Durgin, T.S. Rappaport,H. Xu, Measurements and Models for Radio Path Loss and Penetration Loss in and Around Homes and Trees at 5.85 GHz, IEEE Transactions on Communications, vol. 46, No. 11, Nov. 1998.
C.M. Peter Ho et al., "Antenna Effects on Indoor Obstructed Wireless Channels and a Deterministic Image-Based Wide-Band Propagation Model for In-Building Personal Communications Systems," International Journal of Wireless Information Networks, vol. 1, No. 1, 1994.
S. Kim et al., "Radio Propagation Measurements and Predictions Using Three-dimensional Ray Tracing in Urban Environments at 908 MHZ and 1.9 GHz," IEEE Transactions on Vehicular Technology, vol. 48, No. 3, May 1999.
T.S., Rappaport et al., "Use of Topographic Maps with Building Information to Determine Antenna Placements and GPS Satellite Coverage for Radio Detection and Tracking in Urban Environments," MPRG Technical Report MPRG-TR-95-14, Virginia Tech, Sep. 1995.
R.K. Morrow, Jr. and T.S. Rappaport, "Getting In," Wireless Review Magazine, Mar. 2000.
Wireless Valley Communications, Inc., "SitePlanner 3.16 for Windows 95/98/NT User's Manual," Software User's Manual, pp. 5-148 to 5-156, 1999.
M. Panjwani et al., "Interactive Computation of Coverage Regions for Wireless Communication in Multifloored Indoor Environments," IEEE Journal on Selected Areas in Communications, vol. 14, No. 3, Apr. 1996.

L. Piazzi and H.L. Bertoni, "Achievable Acurracy of Site-Specific Path-Loss Predictions in Residential Enviroments" IEEE Transactions on Vehicular Technology, vol. 48, No. 3, May 1999.

T.S. Rappaport et al., "Wireless Communications: Past Events and a Future Perspective", IEEE Communications Magazine, May 2002.

T,S. Rappaport et al., "Radio Propagation Prediction Techniques and Computer-Aided Channeling Modeling for Embedded Wireless Microsystems," ARPA Annual Report, MPRG Technical Report MPRG-TR-94-12, Virginia Tech, Jul. 1994.

T.S., Rappaport et al., "Use of Topographic Maps with Building Information to Determine Antenna Placements for Radio Detection and Tracking in Urban Environments," MPRG Technical Report MPRG-TR-95-14,Virginia Tech, Nov. 1995.

D. Ullmo et al., "Wireless Propagation in Buildings: A Statistical Scattering Approach," IEEE Transactions on Vehicular Technology, vol. 48, No. 3, May 1999.

T.S. Rappapoprt, "wireless Communications: Principles and Practice" Second Edition, Prentice Hall, 2002.

T.S.. Rappaport et al., "Use of Topographic Maps with Building Information to Determine AntennaPlacements and GPS Satellite Coverage for Radio Detection and Tracking in Urban Environments," MPRG Technical Report MPRG-TR-95-14, Virginia Tech, Sep. 1995.

T.S. Rappaport et al., "Indoor Path Loss Measurement for Homes and Apartments at 2.4 and 5.85 GHz," private report produced for Motorola, Dec. 16, 1997.

T.S. Rappaport, "Isolating Interference," Wireless Review Magazine, May 2000.

Slides from T.S. Rappaport and R. Skidmore, "Introduction to In-Building Wireless Systems," Infocast In-Building Wireless Solutions Conference and Exposition, Feb. 4, 2003.

S. Sandhu, M.P. Koushik and T.S. Rappaport "Predicted Path Loss for Roslyn VA,First set of predictions for ORD Project on Site Specific Propagation Prediction," MPRG Technical Report MPRG-TR-94-20, Virginia Tech, Dec. 1991.

S. Sandhu, M.P. Koushik, and T.S. Rappaport, "Predicted Path Loss for Roslyn VA,First set of predictions for ORD Project on Site Specific Propagation Prediction," MPRG Technical Report MPRC-TR-94-20, Virginia Tech. Mar. 1995.

S. Seidel et al., "Site-Specific Propagation Prediction for Wireless In-Building Personal Communication Design," IEEE Transactions on Vehicular Technology, vol. 43, No. 4, Nov. 1994.

S. Shakkottai and T.S. Rappaport, "Research Challenges in Wireless Networks: A Technical Overview," Proceeding of the Fifth International Symposium on Wireless Personal Multimedia Communications, Honolulu, HI, Oct. 2002.

H. Sherali et al., "On the Optimal Location of Transmitters for Microcellular Radio Communication System Design," IEEE Journal on Selected Areas in Communications, vol. vol. 14, No. 3, pp. 662-673, May 1996.

R. Skidmoore et al., "A Comprehensive In-Building and Microcellular Wireless Communication System Design Tool" The Bradley Department of Electrical Engineering, MPRG-TR-97-13, Jun. 1997, Master' Thesis—unpublished by Virginia Tech for 2 years after submission.

Company Web Page "Actix" www.actix.com product name E-NOS (now E-AMS).

Company Web Page Agilent' www.agilent.com product name: OPAS32.

Company Web Page "Agilent" www.agilent.com product name: Wizard.

Company Web Page "Comarco" www.edx.com product name: SignalPro.

Company Web Page "ComOpt" www. comopt.com. product name: CellOpt AFP.

Company Web Page "Lucent" www.bell-labs.com product name: WiSE.

Company Web Page "Ericsson" www.ericsson.com product name: TEMS Lite.

Company Web Page "Ericsson" www.ericsson.com product name: TEMS.

Company Web Page "Marconi" www.marconi.com product name: PlaNET.

Company Web Page "Marconi" www.marconi.com product name: decibelPlanner.

Company Web Page "Schema"www.schema.com product name: Optimizer.

Company Web Page "ScoreBoard" www.scoreboard.com product name: ScoreBoard.

R. Skidmore, et al., Russell Senate Office Building Propagation Study, Project Report for Joseph R. Loring & Associates; "Project Update," AoC Contract # Acbr96088, prepared for Office of the Architect of the Capitol, Jan. 19, 1997.

R. Skidmore, et al., Russell Senate Office Building Propagation Study, Project Report for Joseph R. Loring & Associates; "Assessment and Study of the Proposed Enhancements of the Wireless Communications Environment of the Russell Senate Office Building (RSOB) and Associated Utility Tunnels," AoC Contract # Acbr96088, prepared for Office of the Architect of the Capitol, Feb. 20, 1997.

R. Skidmore et al., "Interactive Coverage Region and System Design Simulation for Wireless Communication Systems in Multi-Floored Indoor Environments: SMT Plus tm," IEEE ICUPC Proceedings, 1996.

R. Torres et al., "CINDOOR: An Engineering Tool for Planning and Design of Wireless Systems in Enclosed Spaces," IEEE Antennas and Propagation Magazine, vol. 41, No. 4 Aug. 1999.

T.S. Rappaport et al., "Radio Propagation Prediction Techniques and Computer—Aided CHannel Modeling for Embedded Wireless Microsystems," MPRG Tech. Report MPRG-TR-95-08, Virginia Tech, Jul. 1995.

Software by Andrew titled "RF Planner" dated Jun. 17, 1997.

A user guide titled "Andrew Microwave System Planner" dated Jul. 1999.

A user guide titled "Andrew Antenna System Panner" dated Jun. 1999.

Article "Building Database Manipulator" Copyright, Jan. 1998; MPRG and Virginia Tech.

PCS 97 Track 7; Engineering & Systems Management; T. Rappaport. Propagator; vol. 8, No. 3; Fall 1997.

SMT Plus 1.0 User's Manual; R. Skidmore & T. Rappaport; Copyright, Aug. 1996; Virginia Tech.

Office Action dated Aug. 11, 2006 in related counterpart Mexican Patent Application No. PA/A/2003/001034.

Notice of allowance mailed on Feb. 11, 2004 in related counterpart Russian Patent Application No. 2001132940.

English language translation of Office Action dated Aug. 13, 2003 in related counterpart Russian Patent Application No. 2001132940.

English language translation of Office Action dated Jan. 20, 2003 in related counterpart Russian Patent Application No. 2001132940.

Notice of allowance dated Mar. 30, 2007 in related counterpart Mexican Patent Application No. PA/A/2003/001034.

Office Action dated Jan. 23, 2006 in related counterpart Mexican Patent Application No. PA/A/2003/002652.

US 5,664,623, 09/2007, Gulledge, (withdrawn).

Berson, A., Client/Server Architecture, Mc-Graw Hill, Inc. 1992.

Site Planner 3.16 for Windows 95-98NT User's Manual, Wireless Valley Communications, Inc. Apr. 7, 1999.

Form 8-K filed by Aruba networks Inc., U.S. Securities and Exchange Commission, Nov. 4, 2009.

Ko, Y., et al., "A comparison of 3D Computer Propagation with GSM Signal Measurements," IEEE, 1996, pp. 1172-1176.

From Bird' s Eye Real-time Mapping Software dated Jun. 30, 2002.

Piazzi, L., et al., "Effect of Terrain on Path Loss in Urban environments for wireless applications," IEEE Transactions on Antennas and Propagation, vol. 46, No. 8, Aug. 1998.

Kobleus et al., "Optimizing In-Building Coverage," Mar. 1, 1998, pp. 1-4.

Meyers, Jason, "From the inside out: Vewndor guides carriers toward indoor coverage," Jan. 26, 1998.

Safco Technologies, Inc. CDMA WALKABOUT Operators Manual pp. 97, 99.

Gray Somerville and Todd Baylor, Apr. 1996, Intertec, vol. 13, pp. 98+.

Shawn Steward, Sep. 1996, Intertec, vol. 13, p. 22+.

LLC International, Inc.: Pen-based collection and analysis tool; pencat; http://www.lccinc.com/prodserve/PRODUCTS/pencat.html.

Jorgen Anderson et al., Propagation Measurements and models for wireless communications channels; IEEE Communications Magazine; Jan. 1995, pp. 42-49.

Scott Y Siedel et al., "The Impact of surrounding buildings on propagation for wireless In-Building Personal communications system design".

Biddiscombe, J., et al., "The technical working party on Mobile and terrestrial propagation format for a 3D geographical dataset"; Oct. 28-29, 1998; p. 1.

Menezes, V.M et al., "A CAD system for telecommunication engineering in a GIS environment," May-Jun. 1996, p. 1.

Goodhead, H.D.; "The application of radio propagation prediction to spectrum management and radio network design in developing countries," Sep. 22-24, 1992, p. 1.

Lebherz M., et al., "A versatile Wave propagation Model for the VHF/UHF Range Considering Three-Dimensional Terrain," IEEE, Oct. 1992, pp. 1121-1131.

Bell Laboratories, "Wise—A Wireless System Engineering Tool," web pages from http://www.bell-labs.com.

Mobile Systems International, "planet", pub. date unknown, web pages from http://www.msi-swe.se.

EDX Engineering, Inc., "EDX Engineering—Products: Version 2.0 of EDX SignalPro(tm)", pub. dale unknown, web pages from http://www.edx.com.

Ericsson Wireless Communications, "TEMS Total-TEMS Product Overview," pub. dale unknown, web pages from http://www.ericsson.com.

Ericsson Wireless Communications, "TEMS Total-TEMS Frequently asked questions—general," pub. Date unknown, web pages from http://ww. Ericsson.com.

Ericsson Wireless Communications, "TEMS Total-TEMS Light Frequently asked questions—general," pub. Date unknown, web pages from http://ww. Ericsson.com.

Ericsson Wireless Communications, "TEMS Total-TEMS Makes your net work," pub. Date unknown, web pages from http://ww. Ericsson.com.

Skidmore, "Indoor wireless system planning and simulation", The Propagator, vol. 6, No. 2 (Blacksburg: Mobile & Portable Radio Research Group, Bradley Department of Electrical & Computer Engineering, VirginiaPolytechriic Institute & State University, 1996), online: Propagator Spring/Summer 1996 <http://www.mprg.org/publications/Propagator/spring_summer96#shtml#indoor>.

"An indoor site planning tool" (Mobile and Portable Radio Research group, Virginia Polytechnic Institute and state university, Feb. 1999).

"CoCreate Announces New Release of Solid Designer; First System Enabling Users to Attach Parameters to Imported CAD Models", Business Wire, p. 0286, Apr. 7, 1999.

Smith, Alan, "Speedy MicroStation release does 95", Machine Design, v68, n10, p. 98 (1). May 23, 1996.

"Latest new products (New Briefs)", Communications News 37, 5, 98, May 2000.

Tolputt, Elvadia, "ICL moves to consolidate its hold on the manufacturing market with OMAC 2000 under VME," Computergram International, n1371, CGI02230010, Feb. 23, 1990.

Trappey et al, "Object-oriented bill of materials system for dynamic product management," Journal of Intelligent Manufacturing, v7, n5, Oct. 1996, p. 365-371.

Gonzales, Daniel M., "ArchiCAD 4.02", Macworld, Jun. 1, 1992, v9, n6, p. 199, 201, 2 Pages.

"Scholarly Communications Project" Regarding Master's Thesis of Roger R. Skidmore. Printed from http://scholar.lib.vt.edu/theses/delayed/etd-61097-104157/etd-title.html on Mar. 5, 2004.

Rajkumar A et al: "Predicting RF Coverage in Large Environments Using Ray-Beam Tracingand Partitioning Tree Represented Geometry" Wireless Networks, ACM, US, vol. 2, No. 2, Jun. 1, 1996, pp. 143-154.

Intel Technology Journal, vol. 7, Issue 3, Aug. 2003.

IT Wireless Web Article, Nov. 2003.

P. Tournois et al., "Pick your Wireless Solution" Web Article, Mccombs School of Business, University of Texas at Austin.

Article From Visionael Website.

Article From The Chantry Networks Information Website.

Article From The Meru Networks Information Website.

Article From The Legra Networks Information Website.

Article From The Trapez Networks Information Website.

Brian Jenkins. "Airflow Technology-Solving the WLAN Dilemma". Airflow Networks Information Website. Jul. 2003.

Dr. Harry Bims. "Securing Enterprise WLANS". Aug. 2003.

Dr. Harry Bims. "Enabling Voice-Over WLANS". Sep. 2003.

Articles From The Airespace Networks Information Website.

T.S. Rappaport. et al. "Wireless Communications: Past Events and a Future Perspective" IEEE Communications Magazine. Jun. 2002.

R.K. Morrow. Jr.. "Site-Specific Indoor Planning". Applied Microwave and Wireless Magazine Mar. 1999.

Office Action mailed on Mar. 15, 2004 in related counterpart Canadian Patent Application No. 2373423.

Office Action mailed on Jun. 27, 2006 in related counterpart Canadian Patent Application No. 2373423.

Office Action mailed on Mar. 19, 2012 in related counterpart Canadian Patent Application No. 2373423.

Office Action mailed on Nov. 14, 2008 in related counterpart Canadian Patent Application No. 2373423.

Office Action mailed on Nov. 23, 2004 in related counterpart Canadian Patent Application No. 2373423.

International Search Report mailed on Sep. 5, 2000 in related counterpart International Application No. PCT/US00/12913.

English language translation of Office Action mailed on Dec. 19, 2008 in related counterpart Chinese Patent Application No. 00808048.

English language translation of Office Action mailed on Jul. 30, 2004 in related counterpart Chinese Patent Application No. 00808048.

Notice of Allowance mailed on May 8, 2009 in related counterpart Chinese Patent Application No. 00808048.

Office Action mailed on Mar. 27, 2006 in related counterpart European Patent Application No. 00932306.

First Examination Report mailed on Sep. 11, 2003 in related counterpart Indian Patent Application No. IN/PCT/2001/01250.

English language translation of Office Action mailed on Mar. 14, 2007 in related counterpart Israel Patent Application No. 146668.

English language translation of Office Action mailed on May 23, 2007 in related counterpart Korean Patent Application No. 10-2001-7015031.

Office Action mailed on May 14, 2004 in related counterpart Australian Patent Application No. 50045/00.

Office Action mailed on Apr. 30, 2003 in related counterpart Canadian Patent Application No. 50045/00.

Office Action mailed on Feb. 23, 2004 in related counterpart Canadian Patent Application No. 50045/00.

Office Action mailed on Jun. 23, 2003 in related counterpart Canadian Patent Application No. 50045/00.

Notice of allowance mailed on Jun. 24, 2009 in related counterpart U.S. Appl. No. 10/266,711.

Final Office Action mailed on May 29, 2009 in related counterpart U.S. Appl. No. 10/266,711.

Notice of allowance mailed on Aug. 13, 2002 in related counterpart U.S. Appl. No. 09/318,842.

Office Action mailed on Jun. 5, 2001 in related counterpart U.S. Appl. No. 09/318,842.

Office Action mailed on Sep. 26, 2001 in related counterpart U.S. Appl. No. 09/318,842.

Notice of allowance mailed on Apr. 20, 2006 in related counterpart U.S. Appl. No. 09/632,853.

Final Office Action mailed on Nov. 30, 2005 in related counterpart U.S. Appl. No. 09/632,853.

Non Final Office Action mailed on Jul. 26, 2005 in related counterpart U.S. Appl. No. 09/632,853.

Non Final Office Action mailed on Feb. 11, 2005 in related counterpart U.S. Appl. No. 09/632,853.

Non Final Office Action mailed on Aug. 11, 2004 in related counterpart U.S. Appl. No. 09/632,853.

Notice of allowance mailed on Mar. 17, 2006 in related counterpart U.S. Appl. No. 09/633,122.

Final Office action mailed on Jul. 26, 2005 in related counterpart U.S. Appl. No. 09/633,122.
Non Final Office action mailed on Jan. 21, 2005 in related counterpart U.S. Appl. No. 09/633,122.
Non Final Office action mailed on Mar. 15, 2004 in related counterpart U.S. Appl. No. 09/633,122.
Notice of allowance mailed on Apr. 25, 2006 in related counterpart U.S. Appl. No. 09/667,689.
Notice of allowance mailed on Nov. 17, 2005 in related counterpart U.S. Appl. No. 09/667,689.
Non Final Office Action mailed on Jul. 25, 2005 in related counterpart U.S. Appl. No. 09/667,689.
Final Office Action mailed on Mar. 14, 2005 in related counterpart U.S. Appl. No. 09/667,689.
Non Final Office Action mailed on Sep. 29, 2004 in related counterpart U.S. Appl. No. 09/667,689.
Supplementary European Search Report mailed on Dec. 30, 2005 in related counterpart European Patent Application No. 01983916.
International Search Report mailed on Jan. 9, 2002 in related counterpart International Application No. PCT/US01/29418.
International Search Report and Written Opinion mailed on Sep. 5, 2008 in related counterpart International Application No. PCT/US05/026151.
International Preliminary Report on Patentability mailed on Mar. 5, 2009 in related counterpart International Application No. PCT/US05/026151.
Notice of allowance mailed on May 12, 2011 in related counterpart U.S. Appl. No. 11/186,929.
Final Office Action mailed on Oct. 15, 2010 in related counterpart U.S. Appl. No. 11/186,929.
Non Final Office Action mailed on Apr. 5, 2010 in related counterpart U.S. Appl. No. 11/186,929.
Final Office Action mailed on Sep. 30, 2009 in related counterpart U.S. Appl. No. 11/186,929.
Notice of allowance mailed on Apr. 14, 2010 in related counterpart U.S. Appl. No. 11/405,167.
International Search Report and Written Opinion mailed on Aug. 23, 2007 in related counterpart International Application No. PCT/US06/14397.
International Preliminary Report on Patentability dated Oct. 23, 2007 in related counterpart International Application No. PCT/US06/14397.
English language translation of Office Action mailed on Jun. 12, 2010 in related counterpart Chinese Patent Application No. 200680011713.
English language translation of Office Action mailed on Jan. 12, 2011 in related counterpart Chinese Patent Application No. 200680011713.
Office Action mailed on Apr. 7, 2009 in related counterpart Great Britain Patent Application No. GB0721875.

* cited by examiner

Figure 1: Example transmission of data over a communications network
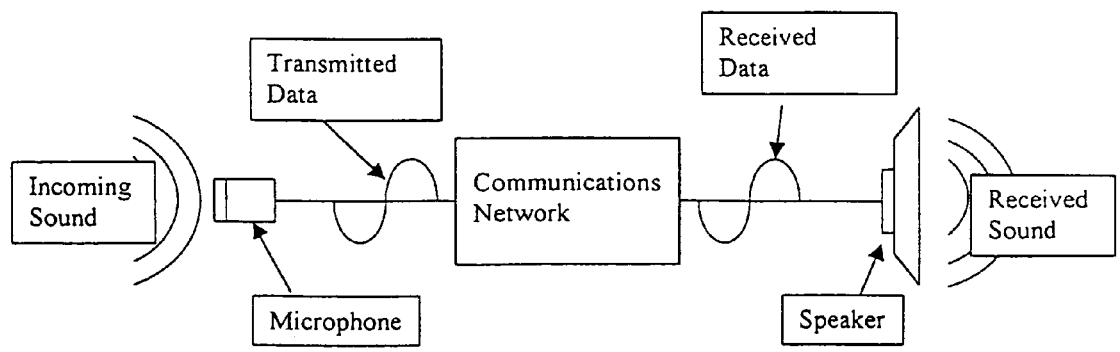
Figure 2: Creation of a digital signal from an analog signal
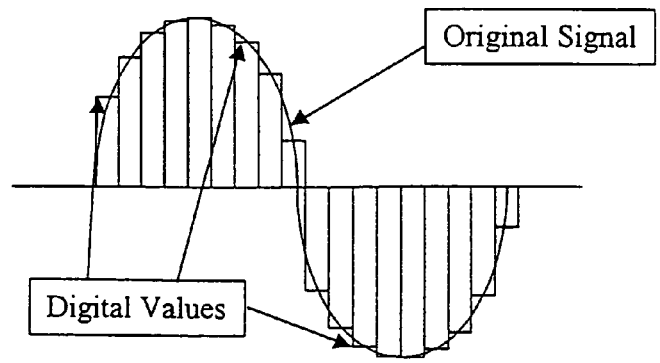

Figure 3: Illustration of the difference between bits, packets and frames.

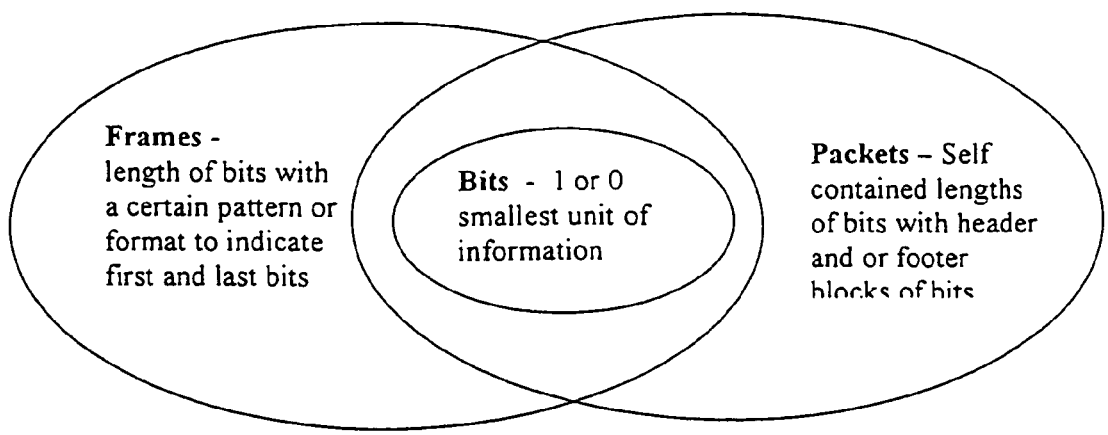

Figure 4: Illustration of the data displayed in each node of the Tree View of a data communications network.

- Name and type of network device
    - Specifications
        - Electrical, Optical, and Electromagnetic specific operating parameters
        - Software, Firmware and Hardware version numbers and settings
    - Physical connectors
        - Specifications and setting specific to each connector Figure 5: Method for creating a 3-D site specific model of the environment
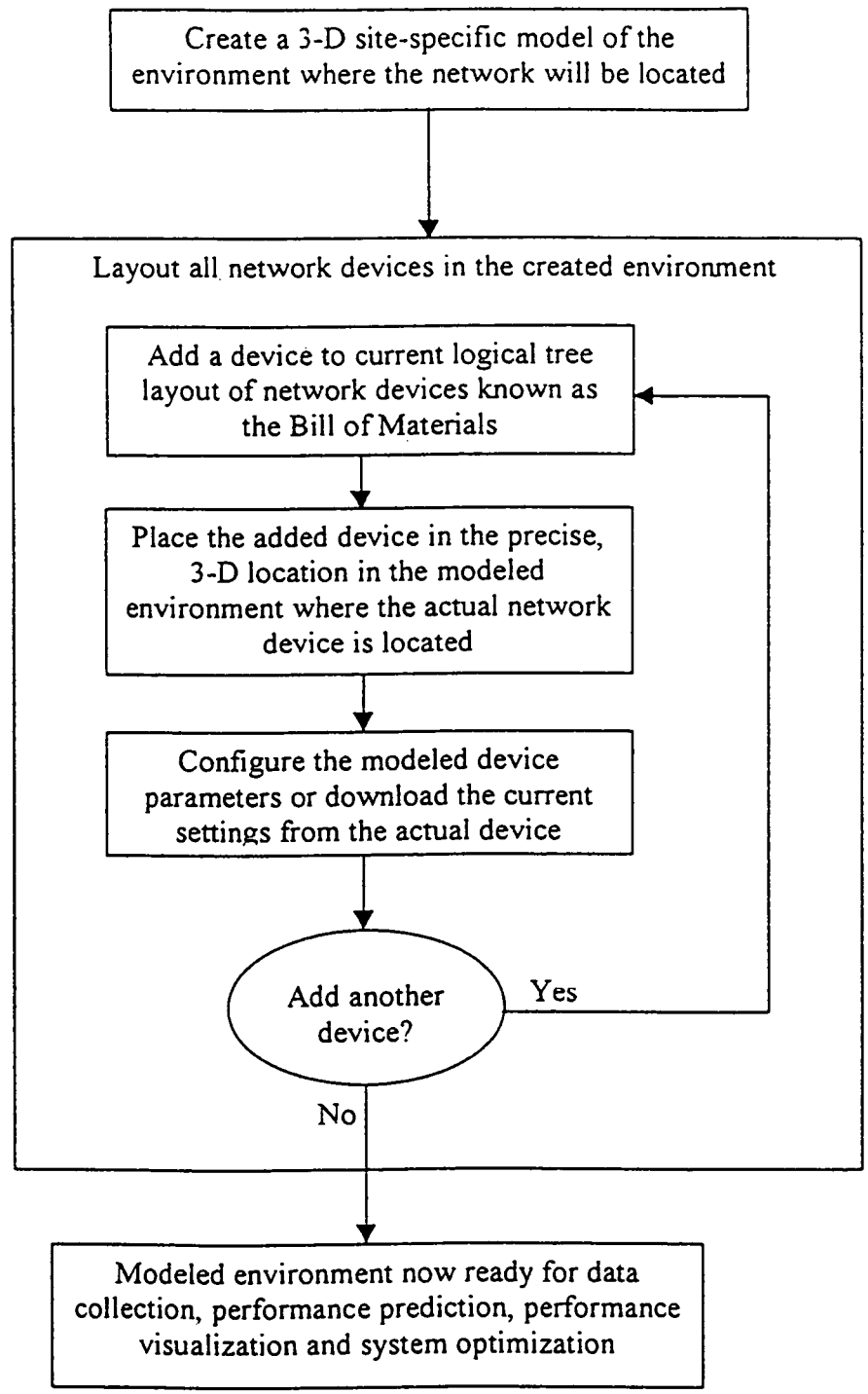

Figure 6: Method for optimizing a data communications network using predictions
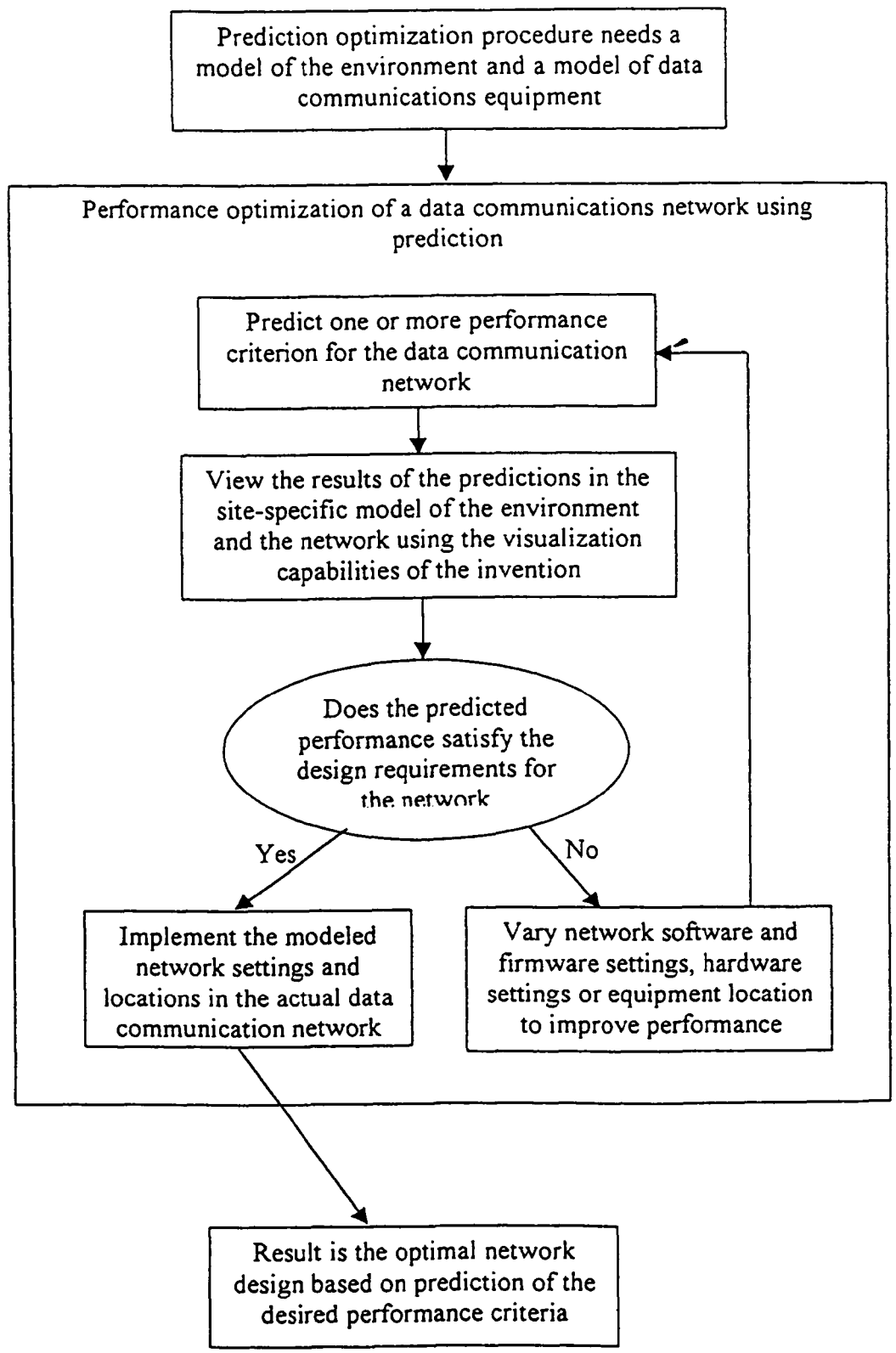

Figure 7: Method for optimizing a data communications network using measurements
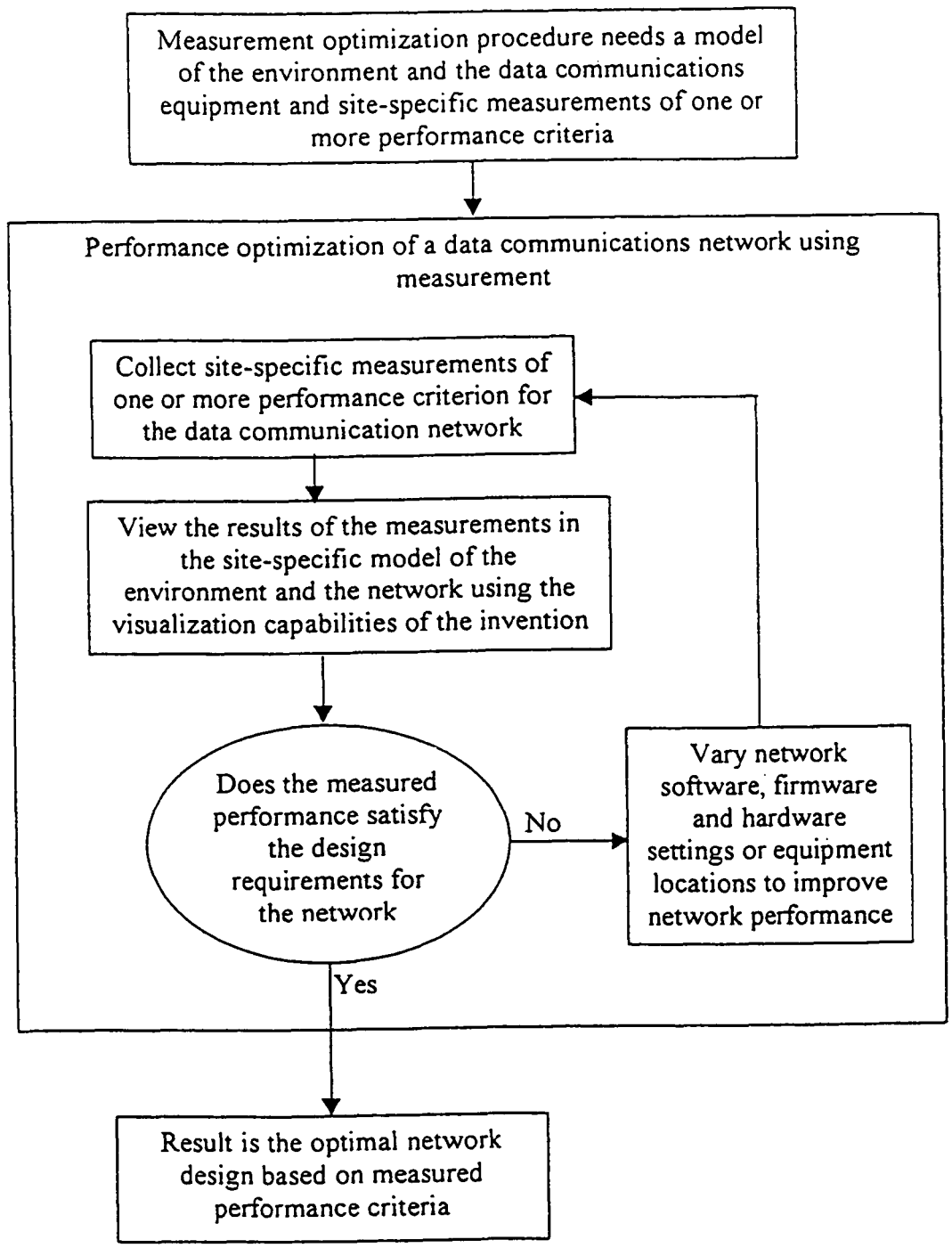

Figure 8: Method for optimizing a data communications network using predictions and measurements.
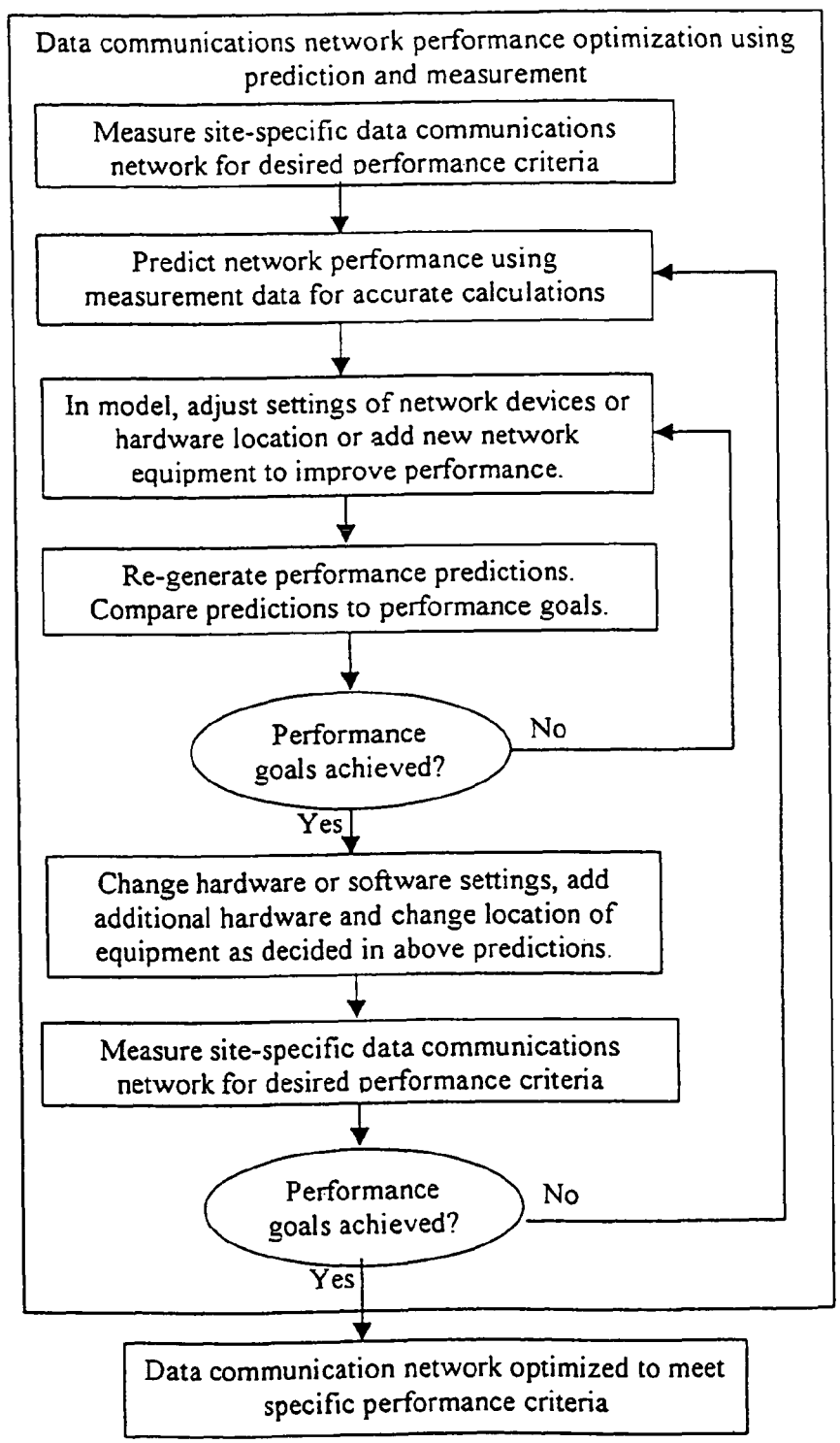

SYSTEM AND METHOD FOR DESIGN, TRACKING, MEASUREMENT, PREDICTION AND OPTIMIZATION OF DATA COMMUNICATION NETWORKS

CROSS-REFERENCE TO RELATED APPLICATIONS

This application is related to pending applications Ser. No. 09/318,842, entitled "Method and System for Managing a Real Time Bill of Materials," filed by T. S. Rappaport and R. R. Skidmore, now U.S. Pat. No. 6,493,679, Ser. No. 09/318,841, entitled "Method And System for a Building Database Manipulator," filed by T. S. Rappaport and R. R. Skidmore, now U.S. Pat. 6,850,946, Ser. No. 09/318,840, entitled "Method and System For Automated Optimization of Communication Component Position in 3-D" filed by T. S. Rappaport and R. R. Skidmore, now U.S. Pat. 6,317,599. Pending application entitled "Method and System for Designing or Deploying a Communications Network which Allows Simultaneous Selection of Multiple Components" filed by T. S. Rappaport and R. R. Skidmore, Ser. No. 09/633,122, filed on Aug. 4, 2000, as well pending applications entitled "Method and System for Designing or Deploying a Communications Network which Considers Frequency Dependent Effects", Ser. No. 09/633,121 filed by T. S. Rappaport and R. R. Skidmore on Aug. 4, 2000, now U.S. Pat. No. 6,625,454, as well as pending application entitled "Method and System for Designing or Deploying a Communications Network which Considers Component Attributes", Ser. No. 09/632,853 filed by T. S. Rappaport, R. R. Skidmore, and Eric Reifsnider on Aug. 4, 2000, as well as application entitled "Improved Method and System for a Building Database Manipulator", Ser. No. 09/633,120 filed by T. S. Rappaport and R. R. Skidmore, now U.S. Pat. No. 6,721,769, and pending_application entitled "System and Method for Efficiently Visualizing and Comparing Communication Network System Performance", Ser. No. 09/632,803 filed by T.S. Rappaport, R.R. Skidmore, and Brian Gold on Aug. 4, 2000, as well as co-pending application "Method and System for Automated Selection of Optimal Communication Network Equipment Model, Position and Configuration in 3-D", Ser. No. 09/667,68, filed by T.S. Rappaport, R.R. Skidmore, and P. SheethalNath filed concurrently, the subject matter of which is incorporated herein by reference.

BACKGROUND OF THE INVENTION

1. Field of the Invention

The invention relates to the field of communications networks, and more specifically to the design thereof, and the measurement, visualization, prediction and optimization of the performance of data communication networks. A method and system to predict, visualize and optimize the performance of data communication networks is used to design, measure, monitor, troubleshoot and improve these data networks using an accurate site-specific model of the physical environment and the components comprising the data network.

2. Description of the Related Art

Communications networks are used to send information from one place to another. This information often takes the form of voice, video or data. To transmit information a communications network breaks down a message into a series of numbers. These numbers describe how to construct the information using some predetermined method. For example, the numbers could represent digital samples of the signal voltage that should be applied to a speaker so that the speaker reproduces the sound of the voice, as shown in FIG. 1. The information is in this case the voice message, which was transmitted over the communications network.

The process of representing information can be analog or digital. In an analog communications network the message that is transmitted is a continuously changing number. In a digital network, numbers that change at discrete, regular intervals, instead of continuously represents the message. The signal is represented by a single number each interval. This number may be converted to a binary form so that the entire message can be represented as a finite number of ones and zeros. Each binary digit in the message is called a bit. These bits are transmitted and interpreted by the receiver as the message. Binary and digital versions of a signal are shown in FIG. 2.

Data communication networks are a specific type of communication network that transmit digital information, represented as bits or bytes (a group of 8 bits), in an indoor or outdoor, wired or wireless network from a transmitter to a receiver. While conceptually simple, the means of transmitting the data from some point A to some point B are complicated and varied in implementation. Hundreds of protocols, hardware devices, software techniques and programs exist to handle how data is sent correctly and efficiently. The exact performance of a given data communication network is extremely difficult to predict or even measure because of this complexity and additionally because of the performance effects of the time varying nature of data communications networks and the channels they operate in.

Data communication network can be classified as either a circuit switched or a packet switched network. Both network types use channels to transmit information. A channel is a named communications path between users of a communications network. A channel may consist of many different individual hardware devices and is a specific route between a transmitter and a receiver. In a circuit switched network, information is transmitted by way of an exclusively reserved channel. A network channel is reserved for the sole use of a single transmission and bits are sent all at once. An example of this is the transmission of a document using a fax machine. In this case the fax machine converts the image of the document into pixels. Each pixel is a small, dot-sized, rectangular piece of the paper. Each pixel is considered to be either black or white. The data that will be transmitted is a series of bits that represent whether each dot is black or white. When the message (in this case an image of a document) is ready to be sent from one fax machine to another, a telephone circuit is dedicated to the data transfer by placing a telephone call on the plain old telephone system (POTS) communications network. The telephone line is used exclusively by the fax transmission, making it a circuit switched transmission. After establishing a connection, all data is sent from the first fax machine to the second in a single, long stream of bits. The bits in this case are transmitted as different frequency tones on the telephone line. A high pitched toned may represent a "1" while a low pitched tone may represent a "0." The receiving fax receives the bits of the message by translating the series of high and low pitch tones into data bits. The receiving fax machine will then be able to reconstruct a copy of the original document by drawing a black dot at the locations indicated by the data bits.

Packet switched networks are another type of data communication networks in which all data bits are transmitted as many, small chunks of data bits called packets and sent individually from one location to another. A packet is a self-contained portion of a full message that is made up of a header, data bits, and sometimes footer. The packet contains information in the header and footer that allows the data communications network to properly transmit the packet and to know of which message the data in the packet is a part. The header generally is labeled with an identifier that the network uses to forward the packet to the correct receiver. The header and footer information are often used to reassemble the packet with other packets to reform the original message and to check if errors were made in the transmission of the packet. The receiver can assembles all received packets into the original message by throwing away the header and footer headings and reassembling the data bits from all packets into the original message.

Packet switched networks are classified as connection oriented or connectionless depending on how the packets are transferred. In connection-oriented networks, a network channel is used predefined for each transmission. While this transmission can consist of multiple packets, the route from transmitter to receiver is already established, so that all packets sent on this channel can immediately be sent directly to the receiver. Whereas, in connectionless networks, packets are sent simultaneously on a shared channel in multiple transmissions. In this case, packets require an identifier that gives the address of the receiver. This address is understood by the communications network to allow the packet to be properly sent to the correct receiver. Since each packet can be transmitted separately and thus interleaved in time with packets from other transmissions, it is generally more efficient to use a connectionless transmission method when using shared network resources.

An example of a connectionless, packet-based transmission is a file transfer between two computers on an internet protocol (IP) based, Ethernet network that both computers are attached to. In this case, the file that is to be transmitted is fragmented at the transmitter into appropriate packets and labeled with the IP address, which is the identifier used by the network to forward the packet to the correct receiver. The packets are then sent from the transmitting computer to the receiving computer. The Ethernet network is capable of supporting multiple file transfers from many different computers all using the same network by controlling the flow of packets from each destination in a shared fashion. The receiver then assembles the packets into an exact copy of the original file, completing the transmission.

All data networks utilize some form of communication protocol to regulate the transmission and reception of information. A protocol is the set of rules that all hardware and software on a communication network must follow to allow proper communication of data to take place. Many hundreds of protocols are in active use today in the worldwide exchange of information. Some of these protocols, such as the Transport Control Protocol (TCP) or the User Datagram Protocol (UDP), define the way in which the network is accessed. Other protocols, such as the Internet Protocol (IP) or the File Transfer Protocol (FTP), define how messages and packets are formatted, transmitted, and received.

All data communication networks may be analyzed in some fashion to evaluate the efficiency and performance of the network as well as to confirm the network is functioning properly. In order to evaluate the functionality of these data networks, certain performance criterion is used. These performance criteria include, but are not limited to: throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time. Each performance criterion specifies a different performance parameter of a data communications network. These criterions are further described below.

A link is a portion of a path followed by a message between a transmitter and a receiver in a data communications network. Network connection often consists of individual devices relaying network packets from the transmitter to the receiver. This means a network connection can consist of several actual transmissions between the original transmitter and the intended receiver. Each individual relay is called a link. Typically a full network connection consists of several links. Performance criteria can be measured for each individual link.

Throughput is a measurement of the amount of data, which can be transmitted between two locations in a data network, not including header, footer or routing information bits. It is generally measured in bits per second (bps) and can be specified for hardware, software, firmware or any combination thereof that make up a connection between transmitter and receiver in a data communication network. Bandwidth is similar to throughput as it is defined for data communication networks. Bandwidth is the raw data rate that may be sustained by a given communications network and is generally slightly higher than throughput. For instance, an Ethernet link may be rated for a 10 Mbps bandwidth but a measurement of an actual file transfer may show that the rate at which data can actually be transferred between two computers using that same link is only a throughput of 6.8 Mbps as is taught in Peterson, L. L. and Davie, B. S., *Computer Networks: A Systems Approach*. San Francisco: Morgan Kaufmann Publishers, 2000.

Quality of service (QoS) is a term that is used to describe networks that allocate a certain amount of bandwidth to a particular network transmitter. Such a network will allow a transmission to request a certain bandwidth. The network will then decide if it can guarantee that bandwidth or not. The result is that network programs have a reliable bandwidth that can more easily be adapted to. When the quality of service of a connection is measured, the bandwidth that the network claims to offer should be compared to the actual bandwidth for different requested bandwidths.

FIG. 3 illustrates the difference between bits, packets, and frames. Various error rates are defined for data communication networks for bits, packets and frames. Bits are the core of packets and frames. The bits are the actual message data that is sent on the communications network. Packets include the data bits and the packet header and packet footer. The packet header and packet footer are added by communications network protocols and are used to ensure the data bits are sent to the right location in the communications network and interpreted correctly by the receiver. The packet header and packet footer are also used to ensure that packets are sent correctly and that errors are detected should they occur. Frames are simply series of bits with a certain pattern or format that allows a receiver to know when one frame begins or ends. A bit error rate is the percentage of bits that reach the receiver incorrectly or do not reach the receiver as compared to the number of bits sent. Packet error rate or dropped packet rate is the percentage of packets that reach the receiver incorrectly or do not reach the receiver as compared to the number of packets sent. A frame error rate is the percentage of frames that reach the receiver incorrectly or do not reach the receiver as compared to the number of packets sent.

Several terms are used to quantify the delay times of certain network events and may be expressed in time units of seconds. Packet latency is the time required to send a packet from transmitter to receiver, while Round Trip Time (RTT) is the time required for a packet to be sent from transmitter to receiver and for some sort of acknowledgement to be returned from the receiver to the original transmitter. Propagation delay, transmission delay, processing delay, and queuing delay describe the time required for different portions of a packet transmission to occur. The packet latency and round trip time of a network connection is found by summing the propagation delay transmission delay, processing delay and queuing delay of either a one way or round trip network connection. Propagation delay is the time required for a packet to traverse a physical distance from the transmitter to the receiver. Transmission delay is the time required from when the first bit of a packet arrives for the last bit of the same packet to arrive. Processing delay refers to the time required to subdivide a data message into the individual packets at the transmitter, and to the time required to recreate the full data message from the data packets at the receiver. Queuing delay refers to the time spent waiting for shared resources to be freed from use by other transmissions. These delay times are all useful for evaluating different aspects of a data communications network performance.

Two other network performance criteria are packet jitter and bandwidth delay product. Packet jitter is the variation in the arrival time of packets that are expected to arrive at a regular rate and is typically measured in time units of seconds. A bandwidth delay product is the number of bits that can be sent from a transmitter before the first bit sent actually reached the receiver. The bandwidth delay product is found by multiplying the packet latency of a certain link by the bandwidth of the same link.

Handoffs occur in wireless data networks when a user moves out of range of one access point and into range of another access point. In this situation, the first access point must pass the responsibility of delivering data to the wireless user to the second access point. The handoff time is the amount of time required by an access point to coordinate with another access point to allow a wireless user to connect from one access point to another access point.

Software utilities and hardware devices have been developed to measure the performance statistics of data communication networks throughout the lifetime of data communication networks. Some of the more common and relevant tools are briefly described here.

A large number of command line tools are available to quickly allow a computer user to measure the approximate network performance a connection. Many command line programs are widely used on Windows, UNIX, and Macintosh operating systems and are somewhat useful for diagnostic and troubleshooting work on data networks. Examples of these command line programs include ping and traceroute. Using the ping command line program, it is possible to measure approximate data latency between different data network devices and confirm that a network connection is available between the two devices. Network connections often consist of individual devices relaying network packets from the transmitter to the receiver. This means a network connection can consist of several actual transmissions between the original transmitter and the intended receiver. Each individual relay is called a link. Typically a full network connection consists of several links. Thus, using traceroute, a probable path from relaying device to relaying device between the transmitter and the receiver can be determined so that the exact links used by the network transmissions are known. Additionally, using traceroute, the time required to traverse each individual link can be measured, and individual links that may not be functioning properly can be identified.

Various command line tools that are not included with operating systems have also been developed for somewhat more accurate, though still approximate, network measurement tasks. Some examples of these tools include ttcp, and tcpdump. ttcp stands for Test TCP http://www.pcausa.com/Utilities/pcattcp.htm and is a free utility originally written for the BSD Linux operating system, but is now available for other UNIX operating systems as well as Microsoft Windows. ttcp is a basic point-to-point throughput measurement program that allows the user to control buffer sizes, various low level TCP or UDP options and control the exact data that is sent.

tcpdump is a simple utility from the class of tools called pack sniffers. Packet sniffers allow a network administrator to view the content, including header and footer information, of actual packets on a network. tcpdump allows a user to view (or "sniff") packets that are received by a host (though not necessarily intended for that host) and display all headers that match a certain user configurable pattern. tcpdump is a useful tool for troubleshooting network connections because it allows the user a direct view of the exact network traffic.

Pathchar is a UNIX command line utility which is capable of measuring the throughput between each network relay device (e.g. a router, hub or switch) in a data communications network by varying the size of the test packets that it transmits and measuring the latency of that packet transmission to various network points. The tool functions very similarly to traceroute but adds the ability to measure throughput (albeit indirectly), not just latency. Pathchar is only limited by the network hardware in the links it measures. The program needs a hub, switch or computer to transmit an acknowledgement to the test packets. This means that hidden links that do not transmit acknowledgements such as Ethernet bridges can not be measured individually by pathchar.

Several companies produce network measurement, monitoring, tracking and forecasting utilities. Some of the commonly used utilities are discussed below. The tools selected are illustrative of the state of the art of network performance measurement and asset tracking.

netViz, made by netViz Corporation, is a visual database program that allows a network administrator to track network equipment in terms of its physical location and in terms of its logical layout. This program allows the user to input the settings, locations, and configurations of the network and track the assets in your network. The tool is capable of storing this data in a two dimensional geographic map or floor plan of a building, but can not track devices in a three dimensional manner. The tool, also, does not provide network testing, measurement or monitoring features, nor does it support communication prediction or performance visualization capabilities for data communication networks. It is simply a database for accurate and useful tracking of assets.

NetIQ Corporation (was Ganymede Software, Inc.) makes a network monitoring and forecasting tool called Chariot. Chariot is able to measure throughput and many other network statistics for all popular network types, operating systems and protocols available today. The program uses a server and several small agent programs to collect data. The server checks each agent, installed on user's computers throughout the network, at regular intervals and uses them to measure network characteristics while storing the results on the server. These agents can measure the network connection to the server or to one another and are capable of simulating the traffic patterns of any network program and any desired usage pattern of one or more hypothetical users. The program is also capable of using the measured data to forecast expected network traffic and conditions.

Visonael Corporation (was NetSuite Development Corporation) makes several network tracking and measurement products, including NetSuite Audit, Design and Advisor. These software products are capable of automatically detecting the network equipment in use. This information as well as manually entered information can then be placed in a physical or logical diagram of the network. Visonael also offers a product to verify that networks have been configured properly and can make recommendations for configuration changes and upgrades to your network. The software products are unable to predict or measure the performance in a site-specific manner and are not capable of predicting the performance of wireless based data communication networks.

SAFCO Technologies, Inc. (now a part of Agilent Technologies) has recently created several wireless data measurement and prediction products. SAFCO makes a product called DataPrint, which is used to measure various data performance parameters of mobile telephone data networks. Their WIZARD® product also supports analysis of the effects of wireless data transmission on the overall capacity and Quality of Service for a wireless telephone network.

Wireless Valley Communications, Inc. has created a new concept called SitePlanner, which is capable of measuring and tracking the site-specific network performance of a data communications network in a physically accurate three-dimensional model of an environment. SitePlanner uses a software module called LANFielder to measure throughput, packet latency and packet error rates for any wired or wireless network connection in any Internet Protocol (IP) data communications network. Additionally, SitePlanner allows a full network to be modeled in a physically accurate manner so that precise measurements and performance predictions can be made in a site specific way. SitePlanner also allows a logical layout of a network to be stored simultaneously with a physical layout. The tool also stores both a logical interconnection and a site-specific model of any communications network using a Bill of Materials format.

In addition to network measurement and asset management tools, a good deal of research has taken place in the field of wireless data communication network performance. The research described below represent the work, which pertains to the field of this invention.

Xylomenos and Polyzos have explored the performance of UDP and TCP packets sent over several fixed, IEEE 802.11 wireless LAN network connections in Xylomenos, G., Polyzos, G. C. "TCP and UDP Performance over a Wireless LAN" *Proceedings of IEEE INFOCOM*, 1999. The research has focused on throughput limitations caused by software implementation issues and operating system shortcomings. The researchers used their own modified version of the command line utilities ttcp, tcpdump and nstat under Linux to perform UDP and TCP throughput tests. All measurements were taken between three fixed locations and focused on varying the wireless LAN card types (PCMCIA or ISA) and the end-user computer hardware (i.e. Pentium 150 with 48 MB of RAM vs a Pentium 200 MMX with 64 MB of RAM). The conclusions the researchers make are recommendations for changes in the implementation of network protocols and linux operating system enhancements. The measurements did not consider the effects of different physical locations or the effect of variations in the wireless communications channel on the network throughput.

Maeda, Takaya and Kuwabara have published a measurement of wireless LAN performance and the validity of a Ray tracing technique to predict the performance of a wireless LAN network (Maeda, Y., Takaya, K., and Kuwabara, N., "Experimental Investigation of Propagation Characteristics of 2.4 GHz ISM-Band Wireless LAN in Various Indoor Environments," *IEICE Transactions in Communications*, Vol. E82-B, No. 10 October 1999). The measurements were tracked in a small, highly radio frequency (RF) controlled environment and indicated that the wireless LAN throughput and BER were correlated to the delay spread of the wireless channel. The researchers have not however presented any way to actually predict a bit error rate or throughput from the predicted delay spread profile output by a ray tracing technique.

Duchamp and Reynolds have presented IEEE 802.11 wireless LAN, packet throughput measurement results for varying distances in Duchamp, D., and Reynolds, N. F., "Measured Performance of a Wireless LAN," *Local Computer Networks*, 1992. *Proceedings, 17th Conference on*, 1992. These measurements were performed in a single hallway. Thus, these measurements, too, suffer from failing to measure a representative environment. The researches did not present a model to predict their results nor did they attempt to validate any sort of computer prediction technique.

Bing has also presented measured results of the performance of IEEE 802.11 Wireless LAN in "Measured Performance of the IEEE 802.11 Wireless LAN," *Local Computer Networks*, 1999. *LCN '99. Conference on*, 1999. Bing presents delay and throughput measurements as well as theoretically based throughput and delay time tabulations for various wireless LAN configurations. The results are given as optimal results, however. All measurements were performed in such a way that the wireless channel had the least possible effect on the overall throughput and delay times. Therefore, the results presented are an upper bound on best possible results and do not extend into a site-specific wireless LAN performance prediction technique.

Hope and Linge have used measurements to calculate the needed parameters for predicting the coverage area of a Wireless LAN network in an outdoor environment by using the Okumura model. The researchers have made outdoor measurements with standard IEEE 802.11 wireless LAN modems to calculate the needed parameters of the Okumura model and have presented these results in Hope, M. and Linge, N., "Determining the Propagation Range of IEEE 802.11 Radio LAN's for Outdoor Applications," *Local Computer Networks*, 1999. *LCN '99. Conference on*, 1999. Using these results, The coverage area outdoors could be calculated. However, the results do not allow the user to predict the performance in terms of throughput or latency of a wireless LAN.

Several patents related to, and which allow, the present invention are listed below:

U.S. Pat. No. 5,491,644 entitled "Cell Engineering Tool and Methods" filed by L. W. Pickering et al;

U.S. Pat. No. 5,561,841 entitled "Method and Apparatus for Planning a Cellular Radio Network by Creating a Model on a Digital Map Adding Properties and Optimizing Parameters, Based on Statistical Simulation Results" filed by O. Markus;

U.S. Pat. No. 5,794,128 entitled "Apparatus and Processes for Realistic Simulation of Wireless Information Transport Systems" filed by K. H. Brockel et al;

U.S. Pat. No. 5,949,988 entitled "Prediction System for RF Power Distribution" filed by F. Feisullin et al;

U.S. Pat. No. 5,987,328 entitled "Method and Device for Placement of Transmitters in Wireless Networks" filed by A. Ephremides and D. Stamatelos;

U.S. Pat. No. 5,598,532 entitled "Method and Apparatus for Optimizing Computer Networks" filed by M. Liron et al.

U.S. Pat. No. 5,953,669 entitled "Method and Apparatus for Predicting Signal Characteristics in a Wireless Communication System" filed by G. Stratis et al.

U.S. Pat. No. 6,061,722 entitled "Assessing Network Performance without Interference with Normal Network Operations" filed by W. J. Lipa et al.

U.S. Pat. No. 5,831,610 entitled "Designing Networks" filed by D. L. Tonelli et al.

U.S. Pat. No. 5,821,937 entitled "Computer Method for Updating a Network Design" filed by Tonelli et al.

U.S. Pat. No. 5,878,328 entitled "Method and Apparatus for Wireless Communication System Organization" filed by K. K. Chawla et al.

An existing product, SitePlanner, described in patent applications Ser. Nos. 09/352,678, 09/221,985, 09/318,842, 09/318,841, 09/318,840, and other inventions cited previously, are useful for designing measuring and optimizing communication networks because the products can predict radio frequency effects directly relevant to any communication network for any physical location. That is, using information about the physical layout of any communications network and the configuration of its hardware, prior art can provide a visual display of the expected received signal strength intensity (RSSI), signal to noise ratio (SNR), relative received power intensity, best server, and equal power location, as well as other useful parameters for voice and data networks, for any modeled physical location. These statistics can be predicted for the forward link (from a transmitter to a receiver), or for the reverse link (replies from the original receiver to an original transmitter) directions for wireless networks. The site-specific nature of these predictions translates directly into quick and useful visualizations of the quality of a communication network. However, the prior art does not consider methods for properly modeling (e.g. predicting) the complexities that go into determining the values for actual network operating performance parameters that are simultaneously affected by multipath propagation, multiple interfering data transmissions from multiple sources, signaling protocols, equalization methods, and the like. Predicting bit error rates, data throughput, delay, and quality of service metrics in a 3-D physical model of an actual site-specific environment is a very difficult task, and one which has not been solved heretofore, since different modem vendors have different and often-times proprietary methods for mitigating or dealing with multipath, multiple access interference, protocol type, packet size, and noise. That is, the state of the art shows how to measure and display and make predictions for basic communication metrics but does not provide specific prediction algorithms for a wide range of important data network performance parameters in a reliable, site-specific manner. Simply put, a wireless network performance prediction engine, which is able to consider an accurately modeled 3-D physical environment, and which exploits knowledge of specific component layouts, is not found in the prior art and is not obvious due to the complex nature of having to account for all possible physical, electrical, and logical factors for all components in a network, as well as the factors within the channel of a wired or wireless network, that lead to actual network performance.

Prior published papers in the area of communications networks do not demonstrate the ability of any invention to accurately predict three dimensional, site-specific network performance criteria. The paper mentioned earlier by Maeda, Y., Takaya, K., and Kuwabara, N., "Experimental Investigation of Propagation Characteristics of 2.4 GHz ISM-Band Wireless LAN in Various Indoor Environments," *IEICE Transactions in Communications*, Vol. E82-B, No. 10 October 1999 has demonstrated the ability to predict the delay spread of a wireless channel and that the prediction correlates well with throughput, but the described method is not actually able to predict throughput or any other network performance criteria. While some prior art has demonstrated the ability to track network assets in a two dimensional manner with some physical accuracy, these products have not contemplated the ability to predict future network performance for similar or different physical environments (e.g. installations). Many products allow the measurement of network performance criteria, but no prior art has contemplated a 3-D representation of the physical environment with the physical installed base of components, for the purpose of predicting network performance parameters. Furthermore, no tool or invention exists that can directly measure, track the assets of, predict the network performance criteria of, and visualize the network performance criteria of a data communications network in a three-dimensional site-specific manner.

Furthermore, none of the prior art has considered an invention that can perform precise, site-specific, three dimensional performance prediction of complicated network parameters using a priori measurements from an existing network, or by using the site-specific layout details of particular components within a data communications network. Furthermore, none of the prior art has autonomously measured site-specific network performance parameters from an actual network system or subsystem using a system of agents, and then applying the specific 3-D locations and measured results of those measurement agents to create a 3-D prediction model for future network performance in the same, similar, or different physical environments. Furthermore, none of the prior art has developed a hierarchical system of measurement and prediction engines, that have the ability to measure network performance parameters in the field and have the ability to produce a predictive engine for network performance parameters that can be shared with remote prediction engines, for the purpose of measuring and predicting network performance in a 3-D site-specific manner.

The present invention extends the prior art in a non-obvious way to provide wireless and wired network performance prediction, visualization and measurement for important data communications-specific performance criteria, also called performance parameters such as throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time in a site-specific, three dimensionally accurate manner. The invention contemplated here allows novel distributed measurement techniques for the above performance parameters. Furthermore, prediction methods for the above performance parameters are created, which use network measurements or applied values derived from other means, and which also use the radio frequency environment, the 3-D physical network layout, the channel propagation characteristics of a site-specific environment, and the specific physical layout of components, for the computation of predicted performance parameter values.

SUMMARY OF THE INVENTION

The present invention is capable of predicting, measuring, and optimizing the performance of a data communications network. The invention is capable of representing a detailed layout of a fully deployed or contemplated communications network within a physically accurate computer representation or model of a three dimensional environment. This allows the invention to store measurements and determine performance predictions within a site-specific representation of the physical environment, while using specific information about the network entities, components, subsystems, and systems used to create the actual or contemplated network. Measurement agents, with known or assigned 3-D position locations, are used to measure in-situ performance parameters that are transmitted to a server processor. The server processor has an accurate 3-D model of the environment, and is able to process the measured data, and is also able to provide predictive models using site-specific information that may be independent of or may make use of measured data. The server process is able to communicate with other server processors in a hierarchical manner, such that data fusion from many remote or collocated networks may be assembled and used for display and cataloging of measurements that may or may not be used for creation of predictive performance models. Alternatively, each server processor is able to compute predictive performance models without the use of measured data, by simply considering the site-specific layout of physical components, as well as the specific delay times, transit times, propagation effects, and multipath and noise factors within the physical network.

The invention can predict throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time in a site-specific, three dimensional model of any environment. The invention can measure and predict all of the above performance criteria and store the results in the physically accurate three-dimensional model of a data communications network and the environment in which it is installed. Further, the invention can display the measured and predicted performance criteria for any data communications network in the three dimensions, site-specific model of the environment. These capabilities provide a powerful design environment for wired and wireless networks, which allows one skilled in the art to quickly and easily design, measure, predict, optimize and visualize data network communication performance criteria in a three dimensional, site-specific manner using methods never before contemplated.

BRIEF DESCRIPTION OF THE FIGURES

FIG. 1: Example transmission of data over a communications network
FIG. 2: Creation of a digital signal from an analog signal
FIG. 3: Illustration of the difference between bits, packets and frames.
FIG. 4: Illustration of the data displayed in each node of the Tree View of a data communications network.
FIG. 5: Method for creating a 3-D site-specific model of the environment
FIG. 6: Method for optimizing a data communications network using predictions
FIG. 7: Method for optimizing a data communications network using measurements
FIG. 8: Method for optimizing a data communications network using predictions and measurements.

DETAILED DESCRIPTION OF THE PREFERRED EMBODIMENTS OF THE INVENTION

The present invention contemplates the abilities to design, measure, predict and optimize the performance of a data communication networks. The invention uses an accurate computer generated three-dimensional model of a communications network stored in a computer database environment. The invention allows the user to place the network cables, hubs, routers, switches, bridges, wireless access points, amplifiers, splitters, antennas (point, omnidirectional, directional, leaky feeder, distributed, array, etc.) transceivers, terminators and other communications and computer networking equipment in their actual modeled physical locations. The present invention uses this highly accurate model of the physical layout of infrastructure to allow a user to visualize, predict and optimize the performance of any communication network in any 3-D site specifically modeled physical location.

The present embodiment of the invention is capable of modeling the site-specific communications network hardware from both a logical connection and a physical location perspective. The invention uses well-known hierarchical, logical connection concepts (sometimes called topological layout) suited for data communications networks in combination with a physically accurate, site-specific model of the data communications network. Previous inventions focus on only the topological, or relational, layout of network components with one another. This invention uses specific 3-D modeling and, therefore, allows highly accurate asset management and facilities tracking of actual installed equipment while simultaneously providing for network performance prediction, measurement, and design capabilities that exploit the exact physical dimensioning of the network. In addition, the invention simultaneously stores an inventory of important network-specific and equipment-specific characterizations of all objects used in the network, such as vendor, model number, network hardware type, operating system version, firmware and software type and version. The hierarchical, tree based model of the network is termed the Layout View. The physically accurate, site-specific model of the network is termed the Site View, whereby the attributes of each device can be displayed, stored or printed by selecting a particular item or node within the 3-D environmental model. Further, network hardware and software components can be interactively replaced, removed, reconfigured or moved to a new location in real-time using either the Layout View or the Site View. Each of these ways of tracking and designing a network in a 3-D site specific model of the environment with accurate dimensioning of true spatial position are further described below and are used to create a Bill of Materials for the modeled data communications network whereby a preferred embodiment is described in co-pending patent application "Method and system for designing or deploying a communications network which considers component attributes," filed on Aug. 4, 2000.

An example of some of the information contained in the Layout View, hierarchical layout of a data communications network is shown in FIG. 4. In the figure, a tree structure is used to display all hardware in the network. Each node in the tree contains information which is used to track the true physical location, logical layout and electrical, optical and electromagnetic connections for the data communications network hardware as well as any version numbers and settings of software or firmware running on that network equipment and the known performance parameters of that equipment, including the device throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time.

The Site View of the invention has a physically accurate, three-dimensional modeling capability to display all network devices in a site-specific model of the environment that the network is located in. That is, the preferred embodiment of the invention allows each modeled hardware and software device to be placed in a three-dimensionally accurate manner and to track attributes of that device relevant to data communications networks. These key attributes include such items as the hardware type, hardware configuration, software type, software configuration, operating system version, as well as upper, lower and "typical" specifications for each component. These specifications may include important device or network subsystem operating parameters, such as throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time. As described below, the Site View supercedes prior art described in previous co-pending patent applications by Wireless Valley Communications, Inc by hereby considering the difficulties and solving data network prediction, design and optimization problems for more complicated data communication networks. Specifically, this new invention considers physical, site-specific modeling techniques and performance prediction methods and design methods for data network systems, both wired and wireless, which have performance characteristics that are based on much more complicated physical factors than just radio signal strength, interference, or multipath alone. In particular, for data communication networks, many additional factors, which relate to particular network equipment or modem designs, such as packet size, equalizer deployment, modulation methodology, source and error coding methods, packet protocols, as well as the number of co-channel network users, the type of persistency used for packet retransmission, or the multipath propagation effects in a wireless system, provide additional factors that must be considered in the design of a communication network that is designed for data traffic as opposed to simply voice traffic.

One difficulty that today's network designer or network system administrator faces is that most networking equipment uses proprietary, non-public methods for implementing various network devices, and these methods vary by specific vendor. Thus, it is difficult to form reliable prediction models by just using basic physical propagation models in a wireless network, for example. As data transmission technologies such as Bluetooth, DSL, Voice over IP, and future packet-based cellular radio network architectures proliferate, the ability to predict and measure specific network performance parameters will become increasingly important, and the ability to properly incorporate measurements into 3-D prediction models for performance parameters will be important for proper network deployment.

This invention considers attributes relevant to packet-switched data communication networks, which require more extensive and non-obvious modeling when compared to traditional cell phone or telephone voice communication systems that are circuit switched and use a dedicated single user (or bounded number of users) per assigned operating channel. Data communication networks have performance criteria that are specific to packet-based systems and that are not useful to all types of communication networks contemplated previously. For this reason, the preferred embodiment of the invention can additionally predict the throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time, based on the specific physical and spatial location of each network component, as well as the physical, electrical, and logical attributes of the specific components. The performance prediction methods take into account all devices and network equipment, including the physical locations within the 3-D modeled environment, using the constructed Bill of Materials of the network within the 3-D modeled environment, and is capable of performance predictions for any desired location in the modeled network and environment, where a location may be within a room, at a particular location in a room, within a building, or in an outdoor region of varying granularity, depending on the requirements of the user.

Prediction of throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time and other performance parameters may be carried out by predicting the performance for all wired network components separately from the performance of wireless components, and then combining the results to get the net network performance. To predict the performance of a wired communication link, it is important to combine the known effects of each piece of wired equipment for the specific network settings, also known as operating or performance parameters, such as protocol type, data type, packet size, and traffic usage characteristics, firmware type, operating system type, typical network performance characteristics, and typical, average, peak, and minimum traffic load on the network. For wireless network components, additional factors concerning propagation, signal strength, interference, and noise must be considered.

The preferred embodiment of the invention allows data communication networks to be accurately characterized for performance prediction in a number of novel ways.

First, performance prediction may be based on field measurements from an actual network, where prediction models are formed from some fit to measured data (an empirically-based model). These field measurements may be made manually, or autonomously, using data collectors, or agents, that continually measure and update the specific network performance metrics that are observed within the physical environment. These data collectors are able to measure, or are assigned, specific 3-D position locations within the physical environment, such position locations corresponding to known positions in the computer model which is used to model the physical environment of the network, and which are known or which are transmitted to a measurement server. The data collectors may be individuals who manually or automatically record or collect observed network performance such as one or more of the aforementioned performance parameters, or the measurement agents may be software or hardware or firmware applications that run on top of network applications for the purpose of routinely measuring for one of more of the numerous network performance parameters listed previously. The agents may be fixed, or may be portable, and may have position location devices, such as GPS or inertial navigation, or an internal map which is activated by a user, so that the position location of the measurement is sent to a server processor. The agents are presumed to have two-way communication with a server processor that may be collocated or remotely located. Measurements from one or more data collectors are routinely or periodically collected and then transmitted, either by wireless or wired means, or by real-time or stored means, to a server processor which is either collocated, or remotely located, from one or more of the measurement agents. For example, the measurements may be recorded by autonomous agents and then transmitted over a fixed network to a processor that integrates all measurements and computes statistics for observation. The measurement sources have known positions in 3-D, or may not be known and used to form a gross estimate of observed network performance. The collected measurements may be sent in real time, stored and forwarded, or sent as file transfers via many means, such as via email, over the world wide web, via wireless, wired or optical links, or in a storage device. This "in-situ" measurement data is passed, with the 3-D position location when available, to the server, which catalogues and processes the specific measurement information. Using the measurement information from the data collectors, the server is able to provide a predictive model by using knowledge of the physical. 3-D environment, and by fusing the many collected inputs into a simplified model of performance that is related to the 3-D physical representation of the world.

In the preferred embodiment of the invention, the server stores and processes the physical location of all measurement devices (where available) as well as all network components and their electrical, logical and technical configuration, while also considering cost and maintenance issues associated with each network component. Using the preferred embodiment, a data communications network can be designed, deployed, tested, predicted, measured, optimized and maintained by collecting the measured data from one or more agents, and processing them at the server to determine a proper prediction engine that allows future network layout with a desired outcome prior to installation. The server engine is able to display the measured results, in a site-specific manner from each measurement agent (that has site-specific information) so that predictions may be compared to measurements on a visual display of a computer or in a stored means (such as an ASCII file comparing predicted versus measured performance parameters).

It is important to note that each measurement agent may be a server, capable of fusing measurement data with the site-specific 3-D layout of the network components and the physical environment. Therefore, each measurement agent may serve as a centralized processor, as well, so that many different physical locations of a particular network may be measured and predicted for performance. Servers may then be collocated or remotely located from the measurement agents, which collect, display, store and use the measurements to form predictive models. In the case of a remote server that receives measurement data from measurement agents, it is possible to remotely monitor, and then predict, the performance of a network that is physically very far from the particular server processor.

The measurement agents may be further controlled or configured by the server processor, so that the agents may be tuned or instructed to perform different types of measurements, such as different packet transmission rates, observation intervals, averaging intervals, protocol types, or other sensible changes which those skilled in the are would conceive for proper network optimization.

A second method for predicting the performance of network parameters is through the use of analytical or simulation methods. These analytical and simulation methods are well known, and relate the physical and electrical characteristics of the network channel to the physical and electrical characteristics of the various network components. Through simulation or analysis, it is possible to determine approximations or bounds on the typical values that one would expect in an actual network configuration of specific components. The present embodiment of the invention allows a user to enter the results of such calculations, so that they are applied as inputs to the prediction model. Therefore, a user of the invention may simply enter "blind" values, based on known methods, as a first guess approach to forming a prediction model of network performance. These first-guess values may then be iterated by the invention, based on feedback from the site-specific measurements of the actual network.

A measured set of data for a typical operating environment with multiple transmitters in a wireless or wired network, are recorded, stored and displayed by the invention, as taught in the previous description about the measurement agents and server processors. Then, some form of best-fit algorithm (minimum mean square, median filter, etc.) may be applied to the predictive models provided in the equations taught below to provide a table look-up for determining proper performance values (e.g. proper values for constants or functions in the performance parameter equations listed below) for a particular site-specific network design. This table look up method allows measured data to be translated into values that may then be used to drive predicted data for all subsequent predictions conducted within the same site-specific 3-D environment in which measurements were made. Alternatively, best guess performance metric values, or best guesses for the functions or constants in the equations listed below, may be fed into the invention, either manually or automatically through a storage means or via a wireless or wired means from a remote or collocated location, for a specific 3-D modeled network environment, wherein the predicted performance at any space or location with the 3-D environment is based on the first, best guess, predictive models. As explained subsequently, these initial best guess, or "blind" models may be based on simulation, analysis, or some combination thereof. The empirically-based predictive models and the initial best guess predictive models may be used in subsequent environments, different from the environment for which measurements or best guesses were made, and the invention allows a catalogue of models to be used easily by the user for subsequent network prediction or design. Measurements of actual network performance may then be overlaid and displayed and stored simultaneously with the network prediction parameters, for rapid comparison. Furthermore, optimization routines compute the best values for minimum error for new predictive models that match the measured network performance within the environment. Thus, the invention allows the user to relate empirically-derived predicted performance parameters or initially guessed network performance parameters within a 3-D site specific configuration of the actual installed or contemplated network, using specific information and physical locations about the network devices and by using the models for wired networks and wireless propagation, multipath, and noise. The model techniques for this invention fuse the many factors that impact network performance into simpler models that support prediction and comparison of measured versus predicted network performance for radio/wireless and wired networks. Thus, performance prediction can be ascertained and compared to measured network performance for use in ongoing network deployment.

Furthermore, by comparing measured network performance metrics to predicted metrics, the invention allows new field measurements to update the previous prediction models in a convenient method, which provides a catalogue of models that is stored and displayed to the user either locally or remotely. Alternatively, using the hierarchy of servers, it is possible to use remotely located servers which compute, transmit, or receive such measurements and predictive models for the remote use, display, measurement and storage of model parameters and results. This is particularly convenient for network administrators who wish to monitor the performance and design of networks that are physically distant from the network of interest.

Measurements of a particular device for desired performance criteria is accomplished either by using the measurement software module available in the preferred invention or by importing a log file from another software or hardware measurement tool. The measurement module within the preferred invention allows the measurement of the performance of any specific portion of a communications network using two or more software programs which are installed and run on either sides of a device or devices. These software programs are called agents. By sending test transmissions between two agents across a specific network connection the preferred invention can measure any particular performance criterion. The results of these measurements are stored for a particular portion of the network.

The preferred embodiment of the invention can also import the logfiles of other measurement programs such as traceroute to measure specific links. This functionality allows site-specific measurements made by external programs to be stored site-specifically. This is accomplished by a two-pass method described in patent Ser. No. 09/221,985, "System for Creating a computer model and measurement database of a wireless communication network" by T. Rappaport and R. Skidmore, filed Dec. 29, 1998. To import a logfile a user simply clicks a point in the model of the environment for each data point to assign a location for each point in the logfile.

In performing network performance measurements, especially for wireless data networks, it is important to know the difference in performance for transmission and reception. This is why the preferred invention can measure the transmission and reception components of the average network statistics. To measure the transmission direction, the size of test packets is varied. By changing the size of the packet sent and the size of the packet returned, the transmission and reception statistics can be separated. This allows a network designer to identify problems in transmission that might otherwise be masked by apparently good reception.

Network performance measurements are not useful if the measurements do not mimic the actual data traffic that a network carries. For this reason, the preferred embodiment of the invention is able to mimic the traffic patterns, network protocols and packet characteristics of actual data. Thus, if web browsing performance is being measured, the invention sends small packets from an access terminal to a web server and returns large packets from that server that are typical of text, image and web script file formats. By measuring the performance of such packets, the invention accumulates accurate network statistics for expected web browsing performance.

The measurements of specific traffic types may also be applied to the use of broadcast or multicast packet performance scenarios. The preferred embodiment of the invention is able to measure performance of multiple transmitters or multiple receivers or both of the same packet information. The performance of this type of transmission are different than point to point measurement because shared resources are used more efficiently in broadcast and multicast scenarios. Thus, the ability of the invention to measure network performance statistics for the overall success of the broadcast or multicast transmission and for each individual transmitter and receiver is quite powerful. This ability allows network designers to better choose which transmitters of multicasts might be redundant or which broadcast transmissions are insufficient to reach all the desired receivers.

In some data communications network, the performance of specific pieces of equipment, such as Ethernet Bridges or even a single cable, is hard to measure because it is transparent to the network layer of a data communications network. For this reason, the ability of the invention to determine the performance of a single device through extrapolation is quite useful. The preferred embodiment of the invention is able to use known performance data for specific pieces of network equipment and extrapolate the contribution of other devices in the network. Measuring and extrapolating enough individual hardware and software links can identify the performance of all network devices. The accuracy and reliability of this procedure heavily depends on an accurate and site-specific model of the data communications network, which the invention possesses.

Extending the extrapolation concept of performance evaluation to the software and hardware components of network equipment demonstrates a further capability of the preferred embodiment of the invention; The invention is able to distinguish in some cases between the performance limits due to software and those due to hardware. For example, in a situation where the transmitter and receiver are the same computer, no hardware is actually involved in the transmission. By measuring network statistics in this situation, one can quantify the performance of just the computer software. By comparing the situation where the transmitter and send are the same to a situation where the transmitter and receiver are different computers the performance of just the computer hardware can be identified. Since the performance of the software in either case will be quite similar, the performance of just the hardware in a connection between two computers can be extrapolated by assuming the software will perform similarly in either case.

Extrapolating the performance of individual network components from measured performance metrics can be time consuming. For this reason, the preferred embodiment of the invention is able to read in data results from a plethora of measurement tools, system utilities and network logfiles to a single internal format. The invention is capable of reading in the output of command line utilities such as ping or ttcp, the logfiles generated by routers and switches such as tcpdump, or even the logfiles of other commercial measurement programs, and these measurement results are stored for use in the predictive engine. The combination of these imported files to a single internal format allows the invention to combine many different measurements and activity logs into a single set of network statistics. This process means the invention requires fewer active measurement campaigns and more diverse and accurate data for better and more accurate network performance modeling.

Accurate, reliable representations of a data communication network require a large number of measured data points. Hence, the preferred embodiment of the invention collects a large amount of data quickly and easily using various methods as described above. The invention does this by providing remote data collection agents, which can be installed on data access terminals or embedded in hardware, software, or firmware within an actual device in the network. The remote data collection agents respond to a server program (the processing server) that controls the measurements made by the remote agent. That is, the remote agent can be directed to make a measurement to or from any other remote agent or processing server using any desired protocol, traffic type, network setting, or configuration. This process does not require any input from a human user at the remote agent's physical location.

The agents simply records the data when asked with the correct settings and reports the results back to a server which stores data from all remote agents and other measurement tools. The server can generate a variety of detailed reports and use the data to make predictions about expected network performance in future. Servers can also function as agents. In this manner, servers can be organized in a hierarchy or a distributed fashion. This allows servers to report measurements to one another and make measurements using other agents or servers. A network designer at a server can then use all collected and reported data to identify problem areas such as fairness or poor distribution of broadcast data, or problem times, such as increased network activity at lunch time with a data communications network.

In order to improve the value of measurement data collected, the preferred embodiment of the invention identifies the exact (if possible) or approximate location of a remote agent. As discussed earlier, remote agents in this case can either be controlled by a user at that physical location, or controlled remotely by a server. In the preferred embodiment of the invention, the agent uses information about the network layout to identify an approximate location. Determining the nearest piece of network equipment and associating the approximate location with the precisely known location of that network equipment accomplishes this. This approximate location can be further refined using dead reckoning, clicking on a location in a map, or using the global positioning system, laser range finders or some other positioning device known now or in the future.

The preferred embodiment of the invention is not only capable of accounting for the effects of different hardware, firmware, software and configuration settings, but it can also predict the effects of just the hardware and firmware, just the software, or of a single configuration setting. The ability of the invention to measure and thus adjust empirically-derived predictions for these effects allows the optimization of the data communications network. By predicting the effects of changing any detailed aspect of the data communications network, a user can immediately visualize the effect of a new component or a setting change. This ability allows a user skilled in the art to design an optimal data communications network by continually making changes and observing the prediction changes.

We now focus on the details for predicting values for network performance parameters based on knowledge of the 3-D site-specific environment as well as the specific components used in the network design.

The throughput and bandwidth of a network are calculated by the invention as functions of any or all of the following operational parameters which impact performance: distance between transmitter and receiver, physical environment specification, packet sizes, error and source coding schemes, packet overhead, modulation techniques, environment, interference, signal strength, number of users, and for wireless networks, the antenna pattern and type, multipath delay, number of multipath components, angle of arrival of multipath components, radio frequency bandwidth, protocol, coding scheme, and 3-D location. In order to predict the bandwidth and throughput of a network connection, the appropriate functions and constants may be calculated from the listed parameters and then predicted for each location and time desired.

For a wired network, throughput (T) or bandwidth (BW) may be derived from a vendor's specification sheet of a product or device, or may be measured in a special laboratory setting. Alternatively, T or BW may be calculated through analysis or simulation, or may be measured in the field using a number of known devices. These means may be used to determine the proper value for T or BW in a network prediction enging such as contemplated here. A formula for predicting the throughput and bandwidth for a wireless data communications channel is shown in equation 1.

$$T \text{ or } BW = C_1[Ad + Bd^2 + C] + C_2[D(RSSI) + E(RSSI)^2 + F] + C_3\sum_{i=1}^{M}(G_iP_i + K_i) \quad (1)$$

where T is throughput, BW is bandwidth, d is the distance between a transmitter and a receiver. RSSI is the received signal strength intensity, which is the power level of the signal at the receiver, either in absolute values or in logarithmic values. A, B, C, $C_1$, $C_2$, $C_3$, D, E, F, $K_i$, are constants or may represent linear or nonlinear functions of one or more physical or electrical parameters, such as physical environment type, packet size, modulation, modem type, or other parameters that relate the physical, electrical, or logical environment of the network. These constants or functions take on specific functional values depending upon if T or BW is being solved for. The value M may denote a particular number of multipath components from a particular transmitter, as determined by propagation analysis of the channel, or the term may denote a combination of important multipath components from a collection of transmitters, where the term "important" is based on antenna pattern, physical environment distances, and other wireless propagation factors which are well known to one skilled in the art and which are explained below. The values of $G_i$ and $P_i$ represent gains and power levels, respectively, for each of M different signal components, which may represent individual multipath components or gross signal components from one or more radiating sources, and $K_i$ represents a finite number of constants or functions for each value of i. Note that Gi, Pi, and the individual Ki may be in logarithmic (e.g. dB) or absolute values. These constants or functions in the above equation may be dependant on distance (a) between transmitter and receiver where d may be the straight-line or actual reflected/diffracted distance of the main signal path between the serving transmitter and receiver, 3-D environment, time of observation or observation interval, noise power, packet sizes, coding scheme, number of users, modulation type, interference, and for wireless networks, may include path loss, multipath delay, number of multipath components, angular spread, strength and angle of arrival of received signals, modulation bandwidth, and other physical, electrical and logical settings of particular equipment in the network, and the constants or functions may be calculated analytically, predicted for an initial guess, or solved using best fit methods between measured and predicted performance of actual networks in a site specific environment.

It is important to note that multipath delay, and its effect on network performance prediction and design, may be considered in many ways, as contemplated by this invention and as shown in Equation (1). First, multipath may be considered individually, whereby each multipath component is considered to arrive from each transmitting device, and the methods for modeling multipath are well known and explained in the prior art, and in numerous research works by Rappaport, et. al. from Virginia Tech. Alternatively, gross multipath effects may be modeled as having a worst-case delay (e.g. propagation distance, d) being approximated by the maximum, average, or median length of the specific building or 3-D environment in which the communication network is modeled. Alternatively, spatial considerations may be used by contemplating the antenna patterns of each transmitter or receiver, so that multipath which arrives only in the main beam of each wireless device is considered in the calculation of delay and in network performance in (1). Alternatively, only the strongest one or two or some finite number of transmitters may be considered for multipath propagation delays, whereby only a finite set of transmitters, such as those most closest to the receiver of interest, or those of a certain standard, frequency, or power setting, are considered to radiate multipath energy and produce RSSI values, and from that finite number of transmitters, only the strongest multipath, or the average, maximum, median, or largest few multipath components are considered in computation of delay. Alternatively, if only a finite number of transmitters are considered, methods described above, such as consideration of the physical environment to determine a gross multipath delay from each transmitter, or the use of a particular antenna pattern to determine most important multipath components, may be used to drive the model of multipath and its impact on network performance. Similar approaches may be used to model the received signal strength, RSSI in equation 1.

Note that the constants or functions of equation (1) may be assigned blindly for initial predictions, and then a specific network within the site-specific environment may be measured empirically so that a best-fit (using a minimum mean square error approach or some other well known method) may be used to assign values for the constants or functions in (1). Note that in (1), the distance (d) may be based on true physical distance from the 3-D site specific model of the environment, or may actually represent a relative distance ratio, where the physical distance between two points is referenced to a convenient close-in free space reference distance, as is customary for propagation predictions, and is taught in (Rappaport, "Wireless Communications, Principle & Practice, Prentice-Hall, 1996)

Propagation delay for network data is predicted for wired networks, where components are interconnected by wire (either fiber or metal wire) by dividing the distance traveled by the propagation speed of the electrical, electromagnetic or optical signals in the device, which are used to transmit the data. For instance, data in a fiber optic cable travels at a speed $2*10^8$ meters per second due to dielectric properties of the cable, which affect the photons in a fiber optic cable that are used to transmit the data. Such photons move at the speed of light in glass, which is less than the free space propagation speed. Thus, if the cable is 200 meters long the transmission delay is equal to $1*10^6$ seconds. By using the site-specific method of modeling the complete network within the present invention, it is possible for the user to simultaneously visualize the network as configured in the environment and see a display of delay and predicted or measured performance of delay within the cable within the 3-D environment. Additionally, using a tool tip mouse cursor or some other pointing means, or using a pull down menu, or by simply viewing the display device which the invention is implemented on, various network performance metrics, as well as stored data from the Bill of Materials and parameters of intere may be visualized or stored.

Predicting the propagation delay for a wireless portion of a data communications network is more difficult than wired networks due to the fact that multiple transmitter sources, such as access points in a Bluetooth network, IEEE 802.11b, or wireless ATM network may be transmitting simultaneously. Furthermore, as mentioned previously, multipath interference can create echoes that may or may not be equalized depending on the specific network equipment used at the wireless receiver or transmitter. However, the same calculation model used for wired networks may be used, with the additional consideration of multipath delay terms, and propagation losses or gains, due to specific multipath components, as shown in Equation (1). This additional consideration of multipath delay is needed to account for the fact that wireless data does not always travel in a straight line, and that physical objects can diffract, reflect, absorb, and scatter radio energy. Thus, to calculate the transmission delay of a wireless link in a data communications network, the distance between the transmitter and the receiver is divided by the propagation speed ($3*10^8$ meters per second) of a wireless communications link and then added to the multipath delay introduced by the indirect paths taken from transmitter to receiver as is shown in equation 2.

$$T_P = \frac{d}{3*10^8 m/s} + \tau_d \qquad (2)$$

Where $T_p$ is the propagation delay in seconds, d is the distance between the transmitter and the receiver in meters, and $\tau_d$ is the multipath delay in seconds. Predicting the multipath delay is performed using well-known raytracing techniques or based on angle of arrival, or signal strength values, or by making estimated based on the physical model of the 3-D environment.

Transmission delay is directly calculated from the bandwidth of a connection using the number of bits transmitted. To calculate transmission delay, the number of transmitted bits is divided by the bandwidth. This calculation is identical for wired and wireless channels but must be performed separately for each network device. The formula is illustrated in equation 3.

$$T_t = \frac{\# \text{ of bits}}{BW} \qquad (3)$$

Where $T_1$ is the transmission delay time in seconds, # of bits are the number of bits in the transmission or packet and BW is the bandwidth of the network link in bits per seconds.

Processing delay must be calculated for each device separately within a network. Processing delay is the time required for a network device to process, store, and forward the data bits that are applied to a network device. Alternatively, processing delay may be the time required for a source to produce a meaningful data stream once it is instructed to do so. Processing delay is known to be zero for devices that do not perform any processing, such as passive network components like cables, antennas, or splitters. Processing time may depend on the packet size, protocol type, operating system, vendor, firmware, hardware, and software versions or configurations, and the type of device and the current computing load on the device. To predict the processing delay of any device it is necessary use a model that accounts for all of these effects. These models may be measured in the field, measured in a test facility, obtained from vendors, or derived from analysis or simulation.

Queuing delay is only applicable to devices that transmit data from multiple users or multiple connections. The queuing delay of a device is the amount of time a particular packet must wait for other traffic to be transmitted. It is difficult to predict the queuing delay of a particular connection because it depends on the amount of traffic handled by a particular device. For this reason, queuing delays can be predicted using a statistical random variable based on the expected performance of the device and/or the expected traffic load. Alternatively, average, median, best or worst case, or some other linear or nonlinear weighting of queuing delay times as defined by the device specifications, or as measured, simulated, or computed by analysis, may be used to calculate a predicted queuing delay time.

Packet latency, round-trip times and handoff delay times are all based on propagation, transmission, processing, and queuing delay times. To accurately predict packet latency and round trip time, the propagation, transmission, processing and queuing delay times must be summed for all network devices in a particular network link and adjusted using the particular traffic type, packet size, and protocol type. For instance, packet latency is the time required for a packet to travel from transmitter to receiver. To predict packet latency for a particular link the propagation, transmission, processing and queuing delay times must be calculated using the specific network connection, traffic type, and packet size for the one-way transmission of a packet.

Round trip times are calculated similarly, except for the transmission and reception of a packet and the return of the acknowledging packet. Thus, to predict the round trip time, the invention takes into account the original packet size and the size of the acknowledging packet as well as the effects of the specific network connection, protocol and traffic type on the propagation, transmission, processing and queuing delays.

Handoff delay times are based on the propagation, transmission, processing and queuing delays involved in two separate wireless access points coordinating the change of control of a wireless device from one access point to another. These delays result because the two access points must transmit data back and forth to successfully perform a handoff. Thus, the prediction of handoff delay time is similar to the prediction of the packet latency time between the two access points. To predict the handoff delay time, the invention calculates the propagation, transmission, processing and queuing delays for the link between the two access points. The invention then adjusts for the specific number of transmissions required and the size of the data, which must be sent to successfully perform a handoff.

When predicting bit error rates, the invention considers wired and wireless error rates. Wireless networks operate in much more hostile electrical environments than their wired counterparts and their interconnections are significantly more difficult to model and, until this invention, practical networks have not successfully been modeled using specific, accurate physical and electrical models of multiple transmitters, multiple interferers, noise sources, and network components within a 3-D site-specific environment. This invention uses 3-D site specific representations of the environment for specific network implementations that are able to consider both wired and wireless networks, and considers physical locations, electrical specifications and attributes of all radiating sources and their antenna systems in a real-world 3-D environmental model. Wireless networks are prone to data errors much more so than wired channels, due to the impact of multipath propagation, multiple transmitters, and noise, as described previously. The fact that radio propagation and noise is more random than for fixed wired networks must be considered for practical design, and is modeled in this invention. For wired channels, bit error rates are simply a measure of the electrical, optical and electromagnetic parameters of a connection and are predicted using a statistical random variable, such as a Gaussian or Poisson random distribution, or other sensible distribution or algorithm known now or in the future, and this random variable is overlaid about the average, median, or typical performance of the network component or network subsystem. The network device or subsystem may include a single wireless node, such as a router or switch, or a complete interconnection of various routers, hubs, switches, wireless access points, and wireless client/server devices that communicate with the network. The network may be wired, wireless, or a combination thereof.

Many performance metrics of a device or a network subsystem, such as Frame Error Rate, Bit Error Rate, or Packet Error Rate, as well as other performance parameters such as throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time may be either derived from a specification of the equipment, may be calculated analytically within the invention or inputted into the invention, or may be measured a priori in advance to using the invention. That is, specific parameters of operation, known as operating parameters or equipment parameters, such as those listed previously, can be either measured or predicted through equipment specifications provided by vendors. Alternatively, they may be measured in-situ by a user or research facility, for proper modeling and input into the invention. Alternatively, they may be calculated based on some known analytical model that contemplates interconnection of devices so that a performance model and operating parameters maybe computed. The statistical random variable to model network performance within the invention can be dependent on the electrical, optical and electromagnetic characteristics of each device such as voltage levels, power levels, impedance, and operating frequencies, or can be generated using a typical observed (measured) value for each network device. For instance, copper wire can be modeled as having a bit error rate of 1 error in $10^6$ or $10^7$ bits transmitted. Once measured and characterized a single initial time, a single component or a string of components within a network may be modeled repeatedly by the invention, so that network performance models Wireless performance parameters, however, are dependent on many more factors than wired bit error rates. For this reason, the invention predicts wireless bit error rates based on the environment, distance between transmitter and receiver, number and types of partitions obstructing the transmission, time, 3-D position, packet size, protocol type, modulation, radio frequency, radio frequency bandwidth, encoding method, error correction coding technique, multipath signal strengths and angle of arrival, and multipath delay. As a result, the calculation of the predicted bit error rate is performed using constants or functions to convert from previously measured or known channel and network equipment performance metrics to an expected bit error rate. A formulation for predicting the bit error rate, frame error rate or packet error rate directly for a data communications channel is shown in equation 4, and is identical to equation 1:

$$BER, PER, \text{ or } FER = \qquad (4)$$
$$C_1[Ad + Bd^2 + C] + C_2[D(RSSI) + E(RSSI)^2 + F + C_3 \sum_{i=1}^{M}(G_i P_i + K_i)$$

where BER is bit error rate, FER is the frame error rate, PER is the packet error rate, d is the distance between a transmitter and a receiver. RSSI is the received signal strength intensity, which is the power level of the signal at the receiver. A, B, C, $C_1$, $C_2$, $C_3$, D, E, F, $K_i$, are constants or linear or non linear functions with different values depending on which of BER, FER, and PER is being calculated. The value M may denote particular number of multipath components from a particular transmitter, or may denote a combination of important multipath components from a collection of transmitters, where the term "important" is based on antenna pattern, physical environment distances, and other wireless propagation factors which are well known to one skilled in the art and which are explained within this disclosure. The each of M values of $G_i$ and $P_i$ represent gains and power levels, respectively, of different signal components, which may represent individual multipath components or gross signal components from one or more radiating sources, and may be in logarithmic or linear values of power. The variables $G_i$ and $P_i$ and each one of the M number of Ki values may be in logarithmic (e.g. dB) or absolute values. These constants in the above equation are dependant on distance (d) between transmitter and receiver where d may be the straight-line or actual reflected/diffracted distance of the main signal path between the serving transmitter and receiver. As explained in the text surrounding equation (1), distance may be straight-line distance, or may be modeled from the gross characteristics of the environment, such as the maximum, average, or median length of the 3-D environment. As with equation (1), equation (4) may consider the distance d as the actual physical distance, or as a relative distance referenced to a close-in reference.

Frame error rates, packet error rates and packet drop rates can all be calculated from bit error rates or predicted directly using the same method as for a bit error rate as described above or as modeled in equation 4. To perform these calculations the invention uses information stored in the site-specific Bill of Materials about the packet size, frame size and the protocol in use, and uses a site-specific propagation and interference modeling technique, such as that utilized in the SitePlanner product by Wireless Valley Communications, Inc.

In wireless networks, modeling the combined effects of all the various sources of errors is extremely difficult. Not only does modulation and specific error and source coding techniques impact the wireless network performance, but so does the impact of antennas, multipath, noise, voice over IP or wireless ATM concatenation methods, modem design of particular wireless modem makers, and the specific RF distribution system used to connect wired and wireless devices. The ability to model such varied effects can be done by allowing field measurement of specific in-situ network performance as explained earlier. By conducting a walk-through or a drive test whereby a mobile receiver is operated and network performance parameters are measured within the site-specific environment, it is then possible to determine best fits for particular modem manufacturers, applying concepts described in equation 1.

Bandwidth delay products can be calculated by the invention directly using information about any or all of the environment, three dimensional position, protocol type, multipath delay, packet sizes, radio frequency, radio frequency bandwidth, coding, number, strength and angle of arrival of multipath components, signal strength, transmission, propagation, processing and queuing delay, bit error rate, packet error rate, and frame error rates. Alternatively the invention can calculate the bandwidth delay product indirectly using previously predicted values. A bandwidth delay product is calculated by multiplying the bandwidth of a certain network device by the total delay introduced by that device. Thus, the formula is illustrated here in equation 5:

$$BWD = \frac{BW}{T_{net}} \quad (5)$$

Where BWD is the bandwidth delay product, BW is the bandwidth and $T_{net}$ is the total delay introduced.

The invention uses statistical models of the consistency of data communications network hardware to predict packet jitter and quality of service (QoS). Both of these performance criterions are measures of the reliability of a network to provide consistent data arrival times. Thus, to calculate the QoS or jitter of a connection, the invention uses formulas which include any or all of the environment, three dimensional position, protocol type, multipath delay, packet sizes, radio frequency, radio frequency bandwidth, coding, number, strength and angle of arrival of multipath components, signal strength, transmission, propagation, processing and queuing delay, bit error rate, packet error rate, frame error rate, throughput, bandwidth, and bandwidth delay product. The formulas include constants or functions, which relate the above variables in general to the variation in the arrival time of data and in specific to the QoS and packet jitter of a connection. The present embodiment of the current invention uses equations (1) or (4) to determine QoS and packet jitter for a data communications network.

The preferred embodiment of the invention predictions consider the effects of not just the site specific, floor plan, building layout, terrain characteristics and RF characteristics, but also the effects of the particular network hardware, firmware and software in the network. The invention allows the network to be modeled down to the settings and locations of the individual data communications devices, using the Bill of Materials discussed earlier. The prediction of network performance statistics takes these settings into account. This means that different transport level protocols (such as TCP or UDP), different protocol settings (such as packet and buffer sizes), the data bandwidth (in bits per second), physical layer transmission methods including modulation techniques (such as QPSK or FHSS), coding schemes (such as CCK or trellis codes), transport media (such as copper, fiber optic cable or wireless connections) and specific frequency bands are taken into account by the invention. These aspects are in addition to the consideration of the location and wireless specific criteria, which includes transmitter-receiver distance (T-R distance), the propagation environment, interference, path loss, number of users sharing the RF resources, multipath delay, the number of multipath components and their strengths and angle of arrival, the ratio of coherent to incoherent power, and the RF bandwidth (in Hz). All of these variables may produce results which may be mapped into the form of equation (1) or (4).

The predictions of the preferred form of the invention consider the characteristics of the data communications network users. Information such as the type of data communications traffic the users offer to the network, the number of users, and the usage patterns over time, are stored in a location specific manner in the invention. That is, points can be placed which represent individual users and the traffic offered by that user or areas in which the characteristics of a group or pool of users can be assigned. The invention takes these points and areas of user traffic into account when making predictions of network performance criterions. This means that if large numbers of users are found in an area covered by access points that are able to adapt to heavy usage, the invention is able to accurately predict the performance of these (or any other) conditions. This is only possible because of the accurate, location specific model of the data communication network. Additionally, since the preferred form of the invention tracks usage patterns of users over time, the resulting measurements may be used by a server processor to form table look-up values for the constants or functions of Equations (1) or (4). Different values of constants or functions for Equations (1) or (4) may be found to predict the performance of the network at different times of day. This is an important aspect of a data communication network prediction model because real networks have peak usage times and lulls in which usage is lower. By tracking the usage of a data communications network over time, the preferred form of the invention can determine if the network will have difficulties at certain times.

In a communications network, the capacity is always a scaled version of the theoretical maximum possible capacity, and the impact of various users, and their propagation characteristics, message sizes, as well as the network characteristics, all combine to bound or limit the capacity that an individual user sees on a network. Consider a network that has, as a bottleneck, a particular component or device which has a maximum rating of Tmax bits per second. This component bounds the maximum possible throughput of the network. Consider that capacity represents the capacity or throughput of a device or network (defined as T or Capacity), where $T(x,y,z,t)=Tmax[\gamma]$, where $\gamma$ is a scaling factor that fuses many different, complicated physical, electrical, and logical conditions into a simple value that ranges between 0 and 1. When gamma is 0, there is no capacity. When gamma is 1, there is maximum capacity. Note that T is a function of 3-D positioning in the network, as well as a function of time. For a particular user, the goal of a network predictive model is to predict the capacity, as a function of 3-D position and as a function of time. Thus, $T[x,y,z,t]$ will range between 0 and $T_{max}$.

The load put on to a data communications network impacts the capacity of an individual user. The number of users and the usage patterns of each user affect the capacity of each user in a data communications network. The preferred embodiment of the invention allows a network designer to see the effects of network loading on the important network statistics, by measuring the instantaneous traffic conditions with the measurement agents as described above. It is possible to determine in-situ capacity measurements through other means, such as observation from network equipment o reporting mechanisms built into hardware or software products. By forming a table look-up of the specific capacity results, as a function of 3-D site-specific location, as well as the time of day, the invention builds a measurement-based predictive model for capacity. These measurements may be used to form a model of capacity, as now presented.

The invention contemplates the fact that the scaling factor on capacity (or throughput), is a function of the instantaneous number of users of the network, the maximum number of simultaneous users of the network, the average and maximum packet size used by users of the network, and for many other factors that are modem or network or vendor or protocol specific. Also, in the case of a wireless network, the multipath propagation effects, the propagation distances between the user and the wireless access points, and the received signal levels are factors that limit capacity. In addition, constants or functions that fuse the impact of modulation, equalizations, impulse noise, and other factors, are used in the invention.

Thus, capacity or throughput of a network is modeled by $$\text{Capacity} = C_1[Ad + Bd^2 + C] + C_2[D(RSSI) + E(RSSI)^2 + F] + C_3 \sum_{i=1}^{M}(G_i P_i + K_i) \quad (6)$$

where the constants or functions of (6) take on similar properties as described for equations (1) and (4). Furthermore, the entire equation (6) may be scaled by K/Umax where K is the instantaneous number of users on the network, and Umax denotes the maximum number of simultaneous users possible.

Handoff delay times are potential problems in wireless data communication networks. A handoff occurs in wireless data networks when a user moves out of range of one access point and into range of another access point. In this situation, the first access point must pass the responsibility of delivering data to the wireless user to the second access point. If the two access points are too far apart, there will not be enough time for a wireless data network user to be handed off from one access point to another and file transfers can fail. The invention predicts where handoffs will occur and the possibility of handoff failures due to incompatible network settings at two different access points by using site-specific time dependent measurements, and fitting them into a form of equation (1), (4) or (6). Then, a table look up method is used to determine prediction models for handoff times as a function of spatial positioning and time of day.

The concept of optimization is a key aspect of the invention. The preferred invention is highly effective at allowing one skilled in the art to quickly improve the performance of an existing data communications network by comparing measured performance parameters with predicted values that are derived and stored in the invention. The process of using measurements to improve predictions is called optimization and is illustrated in FIG. 6, FIG. 7, and FIG. 8. The method for optimizing a network using just measurements is shown in FIG. 6, just predictions in FIG. 7, and a combination of measurements and predictions in FIG. 8. The process of optimizing a data communications network is accomplished by comparing, through numerical, visual, or some other means, the predictions and measurements of performance criteria such as throughput, bandwidth, quality of service, bit error rate, packet error rate, frame error rate, dropped packet rate, packet latency, round trip time, propagation delay, transmission delay, processing delay, queuing delay, network capacity, packet jitter, bandwidth delay product and handoff delay time for various site-specific locations and particular times of day. By changing the hardware used in the network, or changing the locations of hardware or the configuration of that hardware, firmware, or software which controls each device within the network, one skilled in the art can improve the performance of the network. These performance improvements can implemented and viewed by repeating predictions of the performance criteria after site-specific equipment changes to the network have been made in the 3-D model of the network. Continuing this process allows one skilled in the art to optimize the performance of a network to achieve an efficient data communications network.

Using this information, the preferred embodiment of the invention can make recommendations for the areas of the network to upgrade or reconfigure. The invention can also use SNMP protocol communications or other protocols to actually implement these changes. That is, a network designer could identify problems in a data communications network through prediction, whereby the prediction of performance criteria of the data communications network is calculated using known measurement data and the configuration and expected performance of all data communications hardware in the data communications network. The predicted performance criterion is stored and displayed visually and numerically in a location specific, three-dimensional model of the environment. Then, the designer can use the invention to identify a solution to the problems that are apparent by viewing the prediction results, either by following the inventions recommendations for changes or making the designers own change. After simulating the predicted outcome, the network designer can then direct the invention to update all the relevant settings of the equipment with the changes the designer has just used in a prediction. The designer could then use the tool to measure the results of these changes using the measurement features of the invention.

While this invention has been described in terms of its preferred embodiments, those skilled in the art will recognize that the invention can be practiced with considerable variation within the scope of the appended claims.

The invention claimed is:

1. A method for designing, deploying or optimizing an actual communications network operating within a physical space, comprising the steps of:
receiving user inputs specifying different components from a plurality of computerized components each representing a hardware device used in the actual communications network, the user inputs also specifying locations of the hardware communications devices within the physical space, and wherein each of the components in the plurality of components is associated with performance attributes;
generating a computerized model of the physical space using the different components specified by the user inputs and graphically displaying the specified locations of the hardware devices on a display;
predicting a performance metric for said communications network using the computerized model, wherein said performance metric is based upon the particular performance attributes associated with the computerized components representing the hardware devices used in the actual communications network and said specified locations of said different components within the physical space; and
updating the display in real time to reflect the predicted performance metric for said communications network.

2. The method of claim 1 wherein said computerized model generated in said generating step includes computerized components from the database representing hardware devices that create noise or interference, and wherein said noise or interference is reflected as an attribute of said computerized component which is factored into the performance metric in said predicting step.

3. The method of claim 1 wherein said performance metric predicted in said predicting step is predicted in a forward direction in said communication network.

4. The method of claim 1 wherein said performance metric predicted in said predicting step is predicted in a reverse direction in said communication network.

5. The method of claim 1 wherein said predicting considers the effects of multiple signal paths for at least some of said different components.

6. The method of claim 1 wherein the predicted performance metric reflects a composite performance metric due to the combined effects of multiple ones of said different components.

7. The method of claim 6 wherein the composite performance metric considers multi-path factors for at least some of said different components.

8. The method of claim 1 further comprising the steps of:
measuring said performance metric for said communications network within said space; and
modifying predictions made in said predicting step based on measurements made in said measuring step.

9. The method of claim 1 wherein the predicting comprises determining the performance metric for the communications network according to the equation:

$$X = C_1(Ad + Bd^2 + C) + C_2(D(RSSI) + E(RSSI)^2 + F) + C_3 \sum_{i=1}^{M}(G_i P_i + K_i)$$

where X is the performance metric, d is the distance between a transmitter and a receiver, RSSI is a power level of signal at a receiver in either absolute value or logarithmic values, and A, B, C, $C_1$, $C_2$, $C_3$, D, E, F, and $K_i$ are constants or represent linear or nonlinear functions of one or more physical or electrical parameters, the value M denotes a number of multipath components from one or more transmitters, and Gi and Pi respectively represent gains and power levels.

10. A method for designing, deploying or optimizing an actual communications network operating within a physical space, comprising the steps of:
maintaining a database of computerized components representing different types of hardware devices, wherein the database comprises performance attributes associated with each of the hardware devices;
receiving user inputs specifying different components from the plurality of computerized components that represent the hardware devices used in the actual communications network, the user inputs also specifying locations of the hardware communications devices within the physical space;
generating a computerized model of the physical space using the different components specified by the user inputs and graphically displaying the specified locations of the hardware devices on a display;
predicting a performance metric for said communications network using the computerized model, wherein said performance metric is based upon the particular performance attributes associated with the computerized components representing the hardware devices used in the actual communications network and said specified locations of said different components in said computerized model; and
using a table look up to relate empirically measured network performance metrics to the predicted performance metric.

11. The method of claim 10 wherein said performance metric is selected from the group consisting of throughput, error rates, packet latency, packet jitter, symbol jitter, quality of service, security, coverage area, bandwidth, bit error rate, packet error rate, frame error rate, dropped packet rate, queuing delay, capacity, signal level, interference level, round trip time, bandwidth delay product, handoff delay time, signal-to-interface ratio, signal-to-noise ratio, physical equipment price, and cost information.

12. A method for designing, deploying or optimizing an actual communications network operating within a physical space, comprising the steps of:

maintaining a database of computerized components representing different types of hardware devices, wherein the database comprises performance attributes associated with each of the hardware devices;

receiving user inputs specifying different components from the plurality of computerized components that represent the hardware devices used in the actual communications network, the user inputs also specifying locations of the hardware communications devices within the physical space;

generating a computerized model of the physical space using the different components specified by the user inputs and graphically displaying the specified locations of the hardware devices on a display;

generating a prediction of a performance metric of the actual communications network using the computerized model, wherein said performance metric is based upon the performance attributes and the specified locations of the different computerized components representing the hardware devices used in the actual communications network, and-upon information obtained by using a table look up of empirically measured network performance metrics, and said performance attributes.

13. A method for analyzing an actual communications network operating with a physical space, the method comprising the steps of:

receiving user inputs specifying different components from a plurality of computerized components having performance attributes that represent hardware devices used in the actual communications network, the user inputs also specifying locations of the hardware communications devices within the physical space;

generating a computerized model of the communications network within a physical space using the different components specified by the user inputs and graphically displaying the specified locations of the hardware devices on a display;

predicting propagation delay information for said communications network based on said modeled attributes; and predicting propagation delay information for said communications network based on said computerized model, wherein said propagation delay information is based upon the particular performance attributes associated with the computerized components representing the hardware devices used in the actual communications network and said specified locations of said different components within the physical space; and outputting, storing or displaying said propagation delay information.

14. The method of claim 13 wherein at least some of said plurality of components that are modeled in said generating step are used in wireless communications, and wherein said predicting step factors in multiple signal path delays that are attributable to placement of said different components within the computerized model, wherein at least some of the different components represent hardware devices which are used in wireless communications.

15. A method for analyzing an actual communications network operating with a physical space, the method comprising the steps of:

maintaining a database of computerized components representing different types of hardware devices, wherein the database comprises performance attributes associated with each of the hardware devices;

receiving user inputs specifying different components from the plurality of computerized components that represent the hardware devices used in the actual communications network, the user inputs also specifying locations of the hardware communications devices within the physical space, and wherein at least some of the different components specified by the user represent hardware devices used in wireless communications;

generating a computerized model of the communications network within a physical space using the different components specified by the user inputs and graphically displaying the specified locations of the hardware devices on a display;

predicting a performance metric for said communications network using the computerized model, wherein said performance metric is based upon the particular performance attributes associated with the computerized components representing the hardware devices used in the actual communications network and said identified locations of said different components, wherein the predicting factors in delays associated with multiple signal paths associated with the at least some of the different components specified by the user that represent hardware devices which are used in wireless communications; and outputting, storing or displaying said performance metric.

16. The method of claim 15 wherein the predicting comprises determining the performance metric for the communications network according to the equation:

$$X = C_1(Ad + Bd^2 + C) + C_2(D(RSSI) + E(RSSI)^2 + F) + C_3 \sum_{i=1}^{M} (G_i P_i + K_i)$$

where X is the performance metric, d is the distance between a transmitter and a receiver, RSSI is a power level of signal at a receiver in either absolute value or logarithmic values, and A, B, C, $C_1$, $C_2$, $C_3$, D, E, F, and $K_i$ are constants or represent linear or nonlinear functions of one or more physical or electrical parameters, the value M denotes a number of multipath components from one or more transmitters, and Gi and Pi respectively represent gains and power levels.

17. A method for analyzing an actual communications network operating with a physical space, the method comprising the steps of:

maintaining a database of computerized components representing different types of hardware devices, wherein the database comprises performance attributes associated with each of the hardware devices;

receiving user inputs specifying different components from the plurality of computerized components that represent the hardware devices used in the actual communications network, the user inputs also specifying locations of the hardware communications devices within the physical space, and wherein at least some of the different components specified by the user represent hardware devices used in wireless communications;

generating a computerized model of the communications network within a physical space using the different components specified by the user inputs and graphically displaying the specified locations of the hardware devices on a display;

predicting at least one of a round trip time and a bandwidth delay for said communications network using the computerized model, wherein said performance metric is based upon the particular performance attributes associated with the computerized components representing the hardware devices used in the actual communications network, wherein the predicting factors in delays associated with multiple signal paths associated with the at least some of the different components specified by the user that represent hardware devices which are used in wireless communications; and outputting, storing or displaying said at least one of round trip time and bandwidth delay product information.

18. A method for analyzing an actual communications network operating with a physical space, the method comprising the steps of:
maintaining a database of computerized components representing different types of hardware devices, wherein the database comprises performance attributes associated with each of the hardware devices;
receiving user inputs specifying different components from the plurality of computerized components that represent the hardware devices used in the actual communications network, the user inputs also specifying locations of the hardware communications devices within the physical space, and wherein at least some of the different components specified by the user represent hardware devices used in wireless communications;
generating a computerized model of the communications network within a physical space using the different components specified by the user inputs and graphically displaying the specified locations of the hardware devices on a display;
predicting throughput of network information for said communications network using the computerized model, wherein said performance metric is based upon the particular performance attributes and said identified locations of said different components associated with at least two of the computerized components representing the hardware devices used in the actual communications network; and
outputting, storing or displaying said throughput of network information.

19. The method of claim 18 wherein at least some of said different components that are specified by the user represent hardware devices that are used in wireless communications, and wherein said predicting step factors in multipath delay attributable to placement of said different components representing hardware devices that are used in wireless communications.

20. A system for analyzing an actual communications network operating within a physical space, the system comprising:
an input configured to receive user inputs specifying different components from a plurality of computerized components that represent hardware devices used in the actual communications network, the user inputs also specifying locations of the hardware communications devices within the physical space, wherein at least some of the different components specified by the user represent hardware devices used in wireless communications, and wherein each of the plurality of computerized components is associated with performance attributes;
a processor configured to generate a computerized model of the physical space using the different components specified by the user inputs, wherein the processor is further configured to predict a performance metric for said communications network using the computerized model, wherein said performance metric is predicted based upon the particular performance attributes associated with the computerized components representing the hardware devices used in the actual communications network and said specified locations of said different components within the physical space; and wherein the performance metric is selected from the group consisting of propagation delay information, bit error rate, frame error rate, packet error rate, bandwidth delay product, quality of service and throughput of network; and
a display configured to display said performance metric and the specified locations of the hardware devices.

21. The system of claim 20 wherein said performance metric predicts propagation delay information.

22. The system of claim 20 wherein said performance metric predicts bit error rate.

23. The system of claim 20 wherein said performance metric predicts frame error rate.

24. The system of claim 20 wherein said performance metric predicts packet error rate.

25. The system of claim 20 wherein said performance metric predicts at least one of round trip time and bandwidth delay product.

26. The system of claim 20 wherein said performance metric predicts throughput of network.

27. The system of claim 20 wherein said performance metric predicts quality of service information.

28. A method for designing, deploying or optimizing a communications network, comprising the steps of:
generating a computerized model of a space, said space having a plurality of different objects therein each of which may have attributes which impact performance of the communications network;
modeling performance attributes of a plurality of different components which may be used in said communications network;
specifying components from said plurality of different components to be used in said communications network;
specifying locations within said physical space for the specified components in said computerized model;
predicting one or more performance metrics for said communications network according to the generic form of the equation $$X = C_1(Ad + Bd^2 + C) + C_2(D(RSSI) + E(RSSI)^2 + F) + C_3 \sum_{i=1}^{M} (G_i P_i + K_i)$$

where X is the performance metric, d is the distance between a transmitter and a receiver, RSSI is a power level of signal at a receiver either in absolute value or logarithmic values, and A, B, C, $C_1$, $C_2$, $C_3$, D, E, F, and $K_i$ are constants or represent linear or nonlinear functions of one or more physical or electrical parameters, and may include the effects of multiple transmissions, and the value M denotes a number of multipath components from one or more transmitters, and Gi and Pi respectively represent gains and power levels.

29. The method of claim 28 wherein said computerized model generated in said generating step includes objects which create noise or interference, said noise or interference being an attribute of said object which is factored in said predicting step.

30. The method of claim 28 wherein said performance metric predicted in said predicting step is predicted in a forward direction in said communication network.

31. The method of claim 28 wherein said performance metric predicted in said predicting step is predicted in a reverse direction in said communication network.

32. The method of claim 28 wherein said computerized model is three dimensional.

33. The method of claim 28 further comprising the step of specifying data transfer protocol, and wherein said predicting step uses a specified data transfer protocol as a factor in predicting said performance metric.

34. The method of claim 28 further comprising the step of specifying a network loading for said communications network, and wherein said predicting step uses a specified network loading in predicting said performance metric.

35. The method of claim 28 further comprising the steps of:
measuring said performance metric for said communications network within said space;
and
modifying predictions made in said predicting step based on measurements made in said measuring step.

36. The method of claim 28 wherein one or more performance metrics are selected from radio signal strength intensity, connectivity, network throughput, bit error rate, frame error rate, signal-to-interference ratio, signal-to-noise ratio, frame resolution per second, traffic, capacity, signal strength, throughput, error rates, packet latency, packet jitter, symbol jitter, quality of service, security, coverage area, bandwidth, server identification parameters, transmitter identification parameters, best server locations, transmitter location parameters, billing information, network performance parameters, C/I, C/N, body loss, height above floor, height above ground, noise figure, secure coverage locations, propagation loss factors, angle of arrival, multipath components, multipath parameters, antenna gains, noise level reflectivity, surface roughness, path loss models, attenuation factors, throughput performance metrics, packet error rate, round trip time, dropped packet rate, queuing delay, signal level, interference level, quality of service, bandwidth delay product, handoff delay time, signal loss, data loss, number of users serviced, user density, locations of adequate coverage, handoff locations or zones, locations of adequate throughput, $E_c/I_o$, system performance parameters, equipment price, maintenance and cost information, user class or subclass, user type, position location, all in either absolute or relative terms.

* * * * *